(12) United States Patent
Pyun et al.

(10) Patent No.: US 10,127,872 B2
(45) Date of Patent: Nov. 13, 2018

(54) DISPLAY APPARATUS AND METHOD OF DRIVING THE SAME

(71) Applicant: Samsung Display Co., Ltd., Yongin-Si, Gyeonggi-Do (KR)

(72) Inventors: Kihyun Pyun, Gwangmyeong-si (KR); Seung-Woon Shin, Asan-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 15/684,139

(22) Filed: Aug. 23, 2017

(65) Prior Publication Data

US 2018/0268767 A1    Sep. 20, 2018

(30) Foreign Application Priority Data

Mar. 16, 2017  (KR) .......................... 10-2017-0033195

(51) Int. Cl.
*G06F 3/038* (2013.01)
*G09G 3/36* (2006.01)
*G02F 1/1362* (2006.01)
*G02F 1/1335* (2006.01)
*G02F 1/163* (2006.01)

(52) U.S. Cl.
CPC ..... *G09G 3/3655* (2013.01); *G02F 1/133509* (2013.01); *G02F 1/136209* (2013.01); *G02F 1/136213* (2013.01); *G09G 3/3614* (2013.01); *G02F 2001/1635* (2013.01); *G09G 2320/0219* (2013.01); *G09G 2320/0257* (2013.01)

(58) Field of Classification Search
CPC ............... G09G 3/3614; G09G 3/3655; G09G 2320/0219; G09G 2320/0257; G09G 2330/021; G09G 2340/0407; G09G 3/3677; G09G 2320/0214
See application file for complete search history.

(56) References Cited

U.S. PATENT DOCUMENTS 5,896,117 A  *  4/1999  Moon ................. G09G 3/3677
                                                      345/211
2016/0343341 A1    11/2016  Kwak et al.
2016/0372025 A1*  12/2016  Ahn ..................... G09G 3/3614

FOREIGN PATENT DOCUMENTS

KR            101478667 B1   12/2014

* cited by examiner

*Primary Examiner* — Nelson Rosario
(74) *Attorney, Agent, or Firm* — Cantor Colburn LLP

(57) ABSTRACT

A display apparatus includes a display panel, a data driving part and a gate driving part. The gate driving part outputs gate signals to gate lines, respectively, increases the gate signal from a first gate off voltage to a gate on voltage, decreases the gate signal from the gate on voltage to the first gate off voltage, decreases the gate signal from the first gate off voltage to a second gate off voltage in a slope less than a slope in which the gate signal decreases from the gate on voltage to the first gate off voltage, during P (P is a natural number) horizontal time in which P gate line of the gate lines is driven, and increases the gate signal from the second gate off voltage to the first gate off voltage.

20 Claims, 20 Drawing Sheets

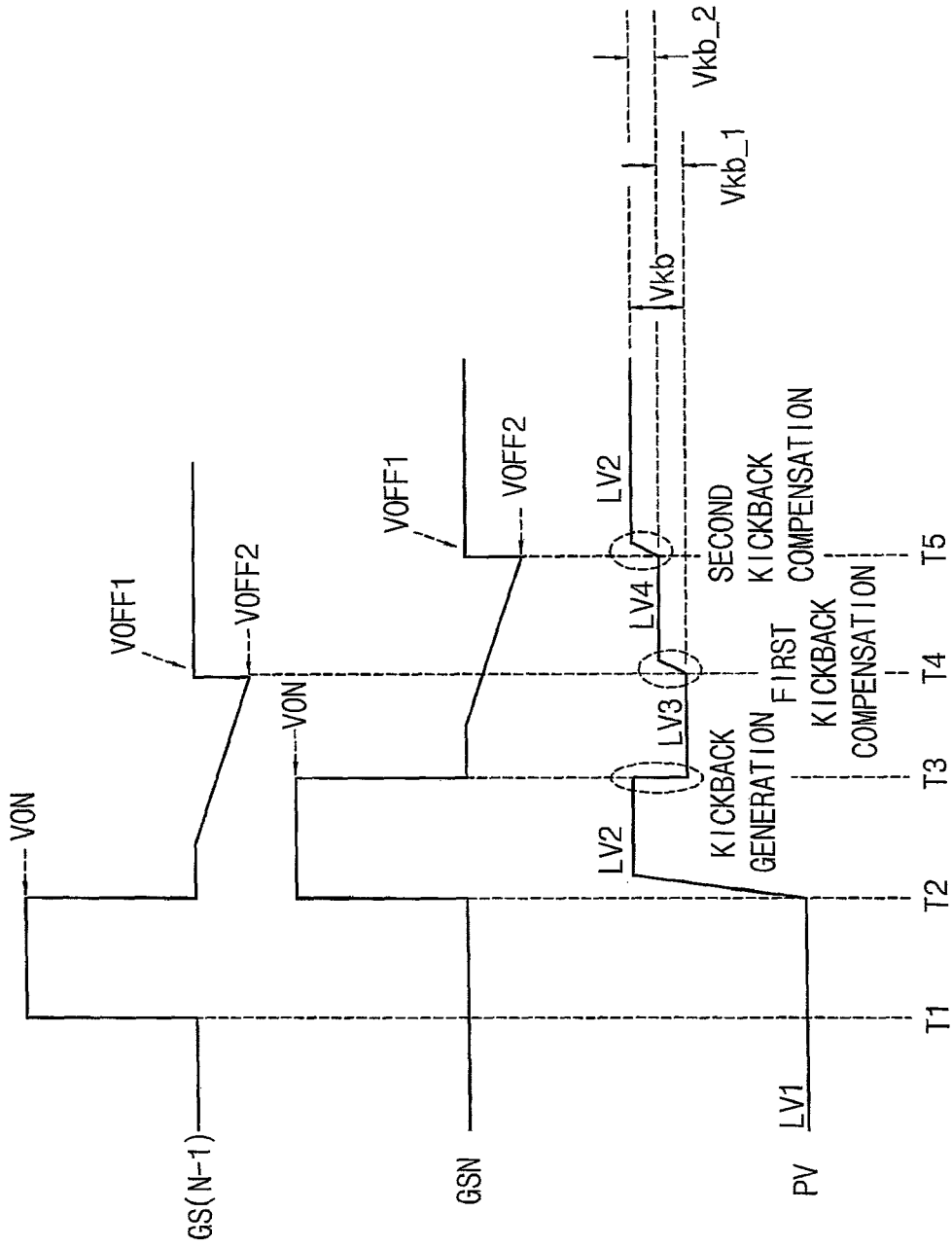

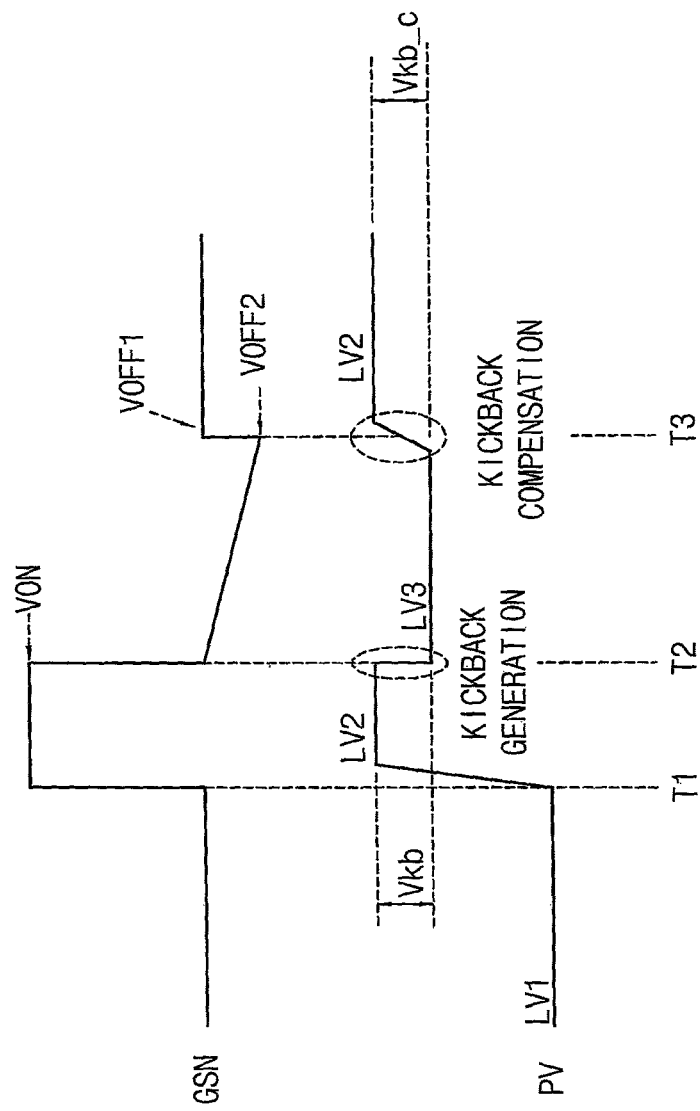

DISPLAY APPARATUS AND METHOD OF DRIVING THE SAME

This application claims priority to Korean Patent Application No. 10-2017-0033195, filed on Mar. 16, 2017, and all the benefits accruing therefrom under 35 U.S.C. § 119, the content of which in its entirety is herein incorporated by reference.

BACKGROUND

1. Field

Exemplary embodiments of the invention relate to an image display, and more particularly to a display apparatus and a method of driving the display apparatus.

2. Description of the Related Art

A display apparatus includes a display panel and a display panel driving apparatus.

The display panel includes a gate line, a data line, and a pixel defined by the gate line and the data line. The pixel includes a thin film transistor ("TFT"), a liquid crystal capacitor and a storage capacitor. The TFT is electrically connected to the gate line and the data line. The liquid crystal capacitor and the storage capacitor are also electrically connected to the TFT.

The display panel driving apparatus includes a gate driving part and a data driving part. The gate driving part outputs a gate signal to the gate line. The data driving part outputs a data signal to the data line.

When the gate signal increases from a gate off voltage to a gate on voltage, the data signal is charged to the pixel as a pixel voltage.

SUMMARY

When a gate signal decreases from a gate on voltage to a gate off voltage, a data signal decreases due to a kickback voltage, and thus a charge rate of the data signal charged to a pixel decreases. Thus, display quality of an image displayed on a display panel decreases.

Exemplary embodiments of the invention provide a display apparatus capable of improving display quality.

Exemplary embodiments of the invention also provide a method of driving the above-mentioned display apparatus.

According to an exemplary embodiment of the invention, a display apparatus includes a display panel, a data driving part and a gate driving part. The display panel displays an image, and includes gate lines, data lines and a pixel. The data driving part outputs data signals to the data lines, respectively. The gate driving part outputs gate signals to the gate lines, respectively, increases a gate signal of the gate signals from a first gate off voltage to a gate on voltage, decreases the gate signal from the gate on voltage to the first gate off voltage, decreases the gate signal from the first gate off voltage to a second gate off voltage in a slope less than a slope in which the gate signal decreases from the gate on voltage to the first gate off voltage, during P (P is a natural number) horizontal time in which P gate line of the gate lines is driven, and increases the gate signal from the second gate off voltage to the first gate off voltage.

In an exemplary embodiment, the gate driving part may decrease the gate signal from the first gate off voltage to the second gate off voltage during two horizontal time in which two gate lines of the gate lines are driven.

In an exemplary embodiment, the gate lines may include an N-th (N is a natural number equal to or greater than two) gate line and an (N−1)-th gate line, and the display panel may further include a thin film transistor ("TFT") electrically connected to the data line and the N-th gate line, a liquid crystal capacitor electrically connected to the TFT, and a storage capacitor electrically connected to the TFT and the (N−1)-th gate line.

In an exemplary embodiment, the gate driving part may include a kickback compensating part controlling the gate signal as the gate on voltage, the first gate off voltage and the second gate off voltage in response to a first gate control signal, a second gate control signal and a third gate control signal.

In an exemplary embodiment, the kickback compensating part may include a first switch disposed between the gate line and a gate on voltage line to which the gate on voltage is applied, and electrically connecting or disconnecting the gate line to or from the gate on voltage line in response to the first gate control signal, a second switch disposed between the gate line and a first gate off voltage line to which the first gate off voltage is applied, and electrically connecting or disconnecting the gate line to or from the first gate off voltage line in response to the second gate control signal, a variable resistor disposed between the gate line and a second gate off voltage line to which the second gate off voltage is applied, and a third switch disposed between the variable resistor and the gate line, and electrically connecting or disconnecting the variable resistor to or from the gate line in response to the third gate control signal.

In an exemplary embodiment, the first gate control signal may be activated, the second gate control signal may be deactivated and the third gate control signal may be deactivated during a first time period, the first gate control signal may be deactivated, the second gate control signal may be activated and the third gate control signal may be deactivated during a second time period following the first time period, the first gate control signal may be deactivated, the second gate control signal may be deactivated and the third gate control signal may be activated during a third time period following the second time period, and the first gate control signal may be deactivated, the second gate control signal may be activated and the third gate control signal may be deactivated during a fourth time period following the third time period.

In an exemplary embodiment, the gate signal may correspond to the gate on voltage during the first time period, the gate signal may correspond to the first gate off voltage during the second time period, the gate signal may decrease from the first gate off voltage to the second gate off voltage during the third time period corresponding to the P horizontal time, and the gate signal may correspond to the first gate off voltage during the fourth time period.

In an exemplary embodiment, the kickback compensating part may include a first switch disposed between the gate line and a gate on voltage line to which the gate on voltage is applied, and electrically connecting or disconnecting the gate line to or from the gate on voltage line in response to the first gate control signal, a second switch disposed between the gate line and a first gate off voltage line to which the first gate off voltage is applied, and electrically connecting or disconnecting the gate line to or from the first gate off voltage in response to the second gate control signal, a low pass filter disposed between the gate line and a second gate off voltage line to which the second gate off voltage is applied, and a third switch disposed between the gate line and the low pass filter, and electrically connecting or disconnecting the gate line to or from the low pass filter in response to the third gate control signal.

In an exemplary embodiment, the gate signals may include an N-th gate signal applied to the N-th gate line, and an (N−1)-th gate signal applied to the (N−1)-th gate line, the (N−1)-th gate signal may increase from the first gate off voltage to the gate on voltage at a first timing, the (N−1)-th gate signal may decrease from the gate on voltage to the first gate off voltage and the N-th gate signal may increase from the first gate off voltage to the gate on voltage at a second timing after the first timing, the N-th gate signal may decrease from the gate on voltage to the first gate off voltage at a third timing after the second timing, the (N−1)-th gate signal may decrease from the first gate off voltage to the second gate off voltage during two horizontal times corresponding to a time between the second timing and a fourth timing after the third timing, the (N−1)-th gate signal may increase from the second gate off voltage to the first gate off voltage, the N-th gate signal may decrease from the first gate off voltage to the second gate off voltage during two horizontal times corresponding to a time between the third timing and a fifth timing after the fourth timing, and the N-th gate signal may increase from the second gate off voltage to the first gate off voltage.

In an exemplary embodiment, a pixel voltage charged in the pixel of the display panel may increase from a first level to a second level at the second timing, may decrease from the second level to a third level between the first level and the second level due to a kickback voltage at the third timing, may increase from the third level to a fourth level between the third level and the second level by a first kickback compensation voltage at the fourth timing, and may increase from the fourth level to the second level by a second kickback compensation voltage at the fifth timing.

In an exemplary embodiment, the first kickback compensation voltage may be $$Vkb\_C1 = \frac{Cst}{Clc + Cst + Cgs + Cds} \times (VOFF2 - VOFF1)$$

calculated by ('Vkb_C1' may denote the first kickback compensation voltage, 'Clc' may denote a capacitance of the liquid crystal capacitor, 'Cst' may denote a capacitance of the storage capacitor, 'Cgs' may denote a capacitance between a gate electrode and a source electrode of the TFT, 'Cds' may denote a capacitance between a drain electrode and the source electrode of the TFT, 'VOFF2' may denote the second gate off voltage, and 'VOFF1' may denote the first gate off voltage).

In an exemplary embodiment, the second kickback compensation voltage may be calculated by $$Vkb\_C2 = \frac{Cgs}{Clc + Cst + Cgs + Cds} \times (VOFF2 - VOFF1)$$

('Vkb_C2' may denote the second kickback compensation voltage, 'Clc' may denote a capacitance of the liquid crystal capacitor, 'Cst' may denote a capacitance of the storage capacitor, 'Cgs' may denote a capacitance between a gate electrode and a source electrode of the TFT, 'Cds' may denote a capacitance between a drain electrode and the source electrode of the TFT, 'VOFF2' may denote the second gate off voltage, and 'VOFF1' may denote the first gate off voltage).

In an exemplary embodiment, the kickback compensating part may include a first switch disposed between the gate line and a gate on voltage line to which the gate on voltage is applied, and electrically connecting or disconnecting the gate line to or from the gate on voltage line in response to the first gate control signal, a second switch disposed between the gate line and a first gate off voltage line to which the first gate off voltage is applied, and electrically connecting or disconnecting the gate line to or from the first gate off voltage line in response to the second gate control signal, a current source disposed between the gate line and a ground voltage terminal to which a ground voltage is applied, and a third switch disposed between the gate line and the current source, and electrically connecting or disconnecting the gate line to or from the current source in response to the third gate control signal.

In an exemplary embodiment, the first gate control signal may be activated, the second gate control signal may be deactivated and the third gate control signal may be deactivated during a first time period, the first gate control signal may be deactivated, the second gate control signal may be activated and the third gate control signal may be activated during a second time period following the first time period, and the first gate control signal may be deactivated, the second gate control signal may be activated and the third gate control signal may be deactivated during a third time period following the second time period.

In an exemplary embodiment, the gate signal may correspond to the gate on voltage during the first time period, the gate signal may decrease from the first gate off voltage to the second gate off voltage during the second time period corresponding to the P horizontal time, and the gate signal may correspond to the first gate off voltage during the third time period.

In an exemplary embodiment, the second gate off voltage may be determined according to a current of the current source and a pulse width of the second gate control signal.

According to an exemplary embodiment of the invention, a method of driving a display apparatus includes outputting a data signal to a data line of a display panel displaying an image and including gate lines including an (N−1)-th (N is a natural number equal to or greater than two) gate line and an N-th gate line, the data line and a pixel, increasing an (N−1)-th gate signal applied to the (N−1)-th gate line from a first gate off voltage to a gate on voltage, decreasing the (N−1)-th gate signal from the gate on voltage to the first gate off voltage, increasing an N-th gate signal applied to the N-th gate line from the first gate off voltage to the gate on voltage, decreasing the N-th gate signal from the gate on voltage to the first gate off voltage, decreasing the (N−1)-th gate signal from the first gate off voltage to a second gate off voltage in a slope less than a slope in which the (N−1)-th gate signal decreases from the gate on voltage to the first gate off voltage, during P (P is a natural number) horizontal time in which P gate line is driven, increasing the (N−1)-th gate signal from the second gate off voltage to the first gate off voltage, decreasing the N-th gate signal from the first gate off voltage to the second gate off voltage in a slope less than a slope in which the N-th gate signal decreases from the gate on voltage to the first gate off voltage, during P horizontal time, increasing the N-th gate signal from the second gate off voltage to the first gate off voltage.

In an exemplary embodiment, the decreasing (N−1)-th gate signal from the first gate off voltage to the second gate off voltage may include decreasing (N−1)-th gate signal from the first gate off voltage to the second gate off voltage during two horizontal times in which two gate lines of the gate lines are driven, and the decreasing the N-th gate signal from the first gate off voltage to the second gate off voltage may include decreasing the N-th gate signal from the first gate off voltage to the second gate off voltage during two horizontal times in which two gate lines of the gate lines are driven.

In an exemplary embodiment, the increasing the (N−1)-th gate signal from the first gate off voltage to the gate on voltage may include increasing the (N−1)-th gate signal from the first gate off voltage to the gate on voltage at a first timing, the decreasing the (N−1)-th gate signal from the gate on voltage to the first gate off voltage may include decreasing the (N−1)-th gate signal from the gate on voltage to the first gate off voltage at a second timing after the first timing, the increasing the N-th gate signal from the first gate off voltage to the gate on voltage may include increasing the N-th gate signal from the first gate off voltage to the gate on voltage at the second timing, the decreasing the N-th gate signal from the gate on voltage to the first gate off voltage may include decreasing the N-th gate signal from the gate on voltage to the first gate off voltage at a third timing after the second timing, the decreasing the (N−1)-th gate signal from the first gate off voltage to the second gate off voltage may include decreasing the (N−1)-th gate signal from the first gate off voltage to the second gate off voltage during two horizontal times corresponding to a time between the second timing and a fourth timing after the third timing, the increasing the (N−1)-th gate signal from the second gate off voltage to the first gate off voltage may include increasing the (N−1)-th gate signal from the second gate off voltage to the first gate off voltage at the fourth timing, the decreasing the N-th gate signal from the first gate off voltage to the second gate off voltage may include decreasing the N-th gate signal from the first gate off voltage to the second gate off voltage during two horizontal times corresponding to a time between the third timing and a fifth timing after the fourth timing, and the increasing the N-th gate signal from the second gate off voltage to the first gate off voltage may include increasing the N-th gate signal from the second gate off voltage to the first gate off voltage at the fifth timing.

In an exemplary embodiment, a pixel voltage charged in the pixel of the display panel may increase from a first level to a second level at the second timing, may decrease from the second level to a third level between the first level and the second level due to a kickback voltage at the third timing, may increase from the third level to a fourth level between the third level and the second level by a first kickback compensation voltage at the fourth timing, and may increase from the fourth level to the second level by a second kickback compensation voltage at the fifth timing.

According to the invention, a pixel voltage decreased due to a kickback voltage may be compensated by a first kickback compensation voltage and a second kickback compensation voltage. Therefore, a charge rate decrease of a pixel may be prevented, and thus display quality of a display apparatus may be improved.

BRIEF DESCRIPTION OF THE DRAWINGS

The above and other features and advantages of the invention will become more apparent by describing in detailed exemplary embodiments thereof with reference to the accompanying drawings, in which:

FIG. 5 is a timing diagram illustrating an (N−1)-th gate signal applied to an (N−1)-th gate line of FIG. 2, an N-th gate signal applied to an N-th gate line of FIG. 2, and a pixel voltage charged in the pixel of FIG. 2, by the display apparatus of FIG. 1;

FIG. 17 is a timing diagram illustrating an exemplary embodiment of an N-th gate signal and a pixel voltage according to the invention.

DETAILED DESCRIPTION

Figure 1:
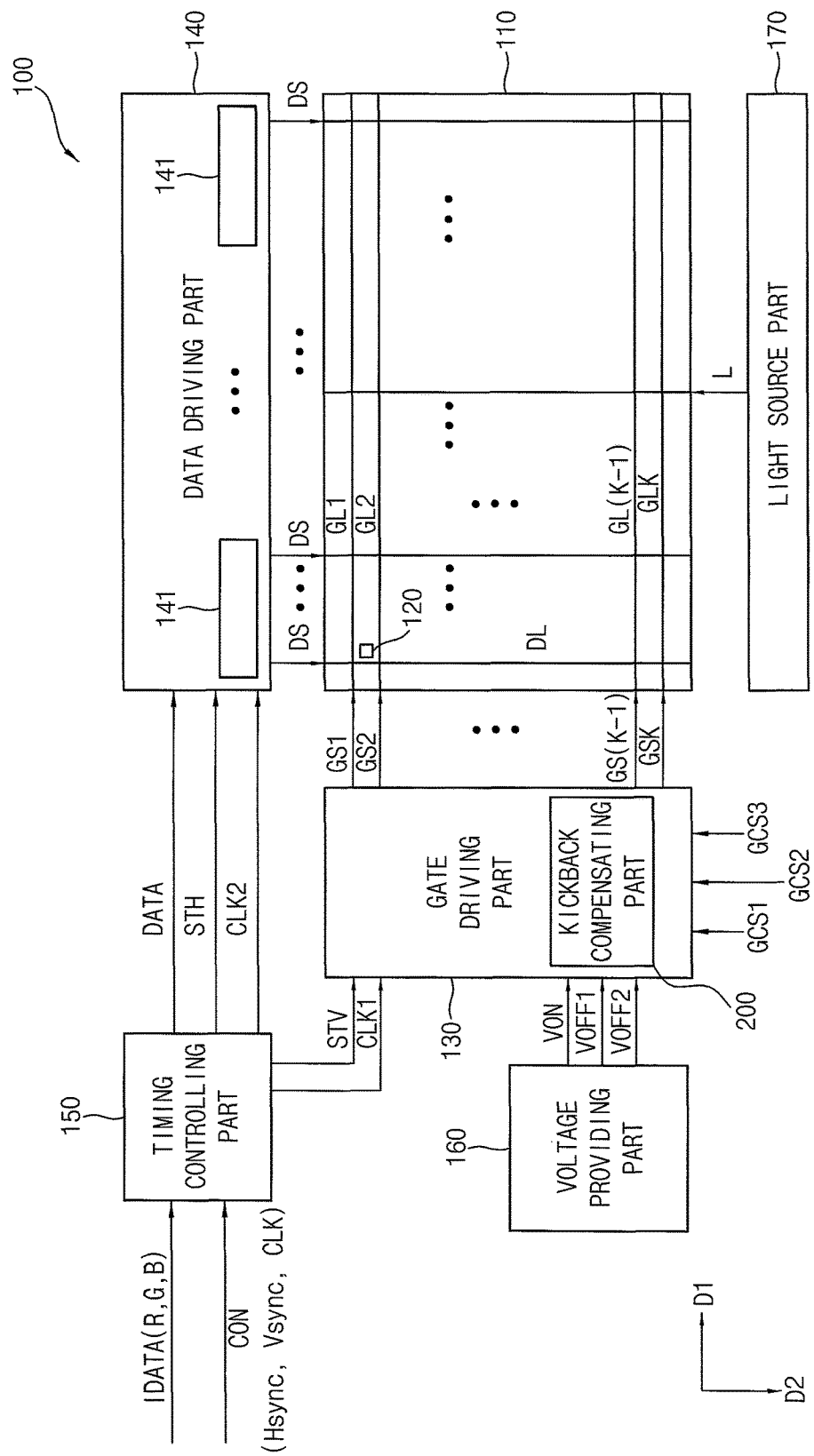
FIG. 1 is a block diagram illustrating an exemplary embodiment of a display apparatus according to the invention.

Hereinafter, the invention will be explained in detail with reference to the accompanying drawings. This invention may, however, be embodied in many different forms, and should not be construed as limited to the embodiments set forth herein. Rather, these embodiments are provided so that this invention will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

FIG. 1 is a block diagram illustrating a display apparatus according to an exemplary embodiment of the invention.

Referring to FIG. 1, the display apparatus 100 according to the illustrated exemplary embodiment includes a display panel 110, a gate driving part 130, a data driving part 140, a timing controlling part 150, a voltage providing part 160 and a light source part 170.

The display panel 110 receives a data signal DS from the data driving part 140 to display an image. The display panel 110 includes first to K-th gate lines GL1, GL2, GL(K−1) and GLK, data lines DL and pixels 120. The first to K-th gate lines GL1, GL2, GL(K−1) and GLK extend in a first direction D1 and are arranged in a second direction D2 substantially perpendicular to the first direction D1. The data lines DL extend in the second direction D2 and are arranged in the first direction D1. Here, the first direction D1 may be parallel to a long side of the display panel 110, and the second direction D2 may be parallel to a short side of the display panel 110. In an exemplary embodiment, the display panel 110 may be a liquid crystal display panel including a liquid crystal, for example. In another exemplary embodiment, the display panel 110 may be a quantum dot display panel including a quantum dot, for example.

Figure 2:
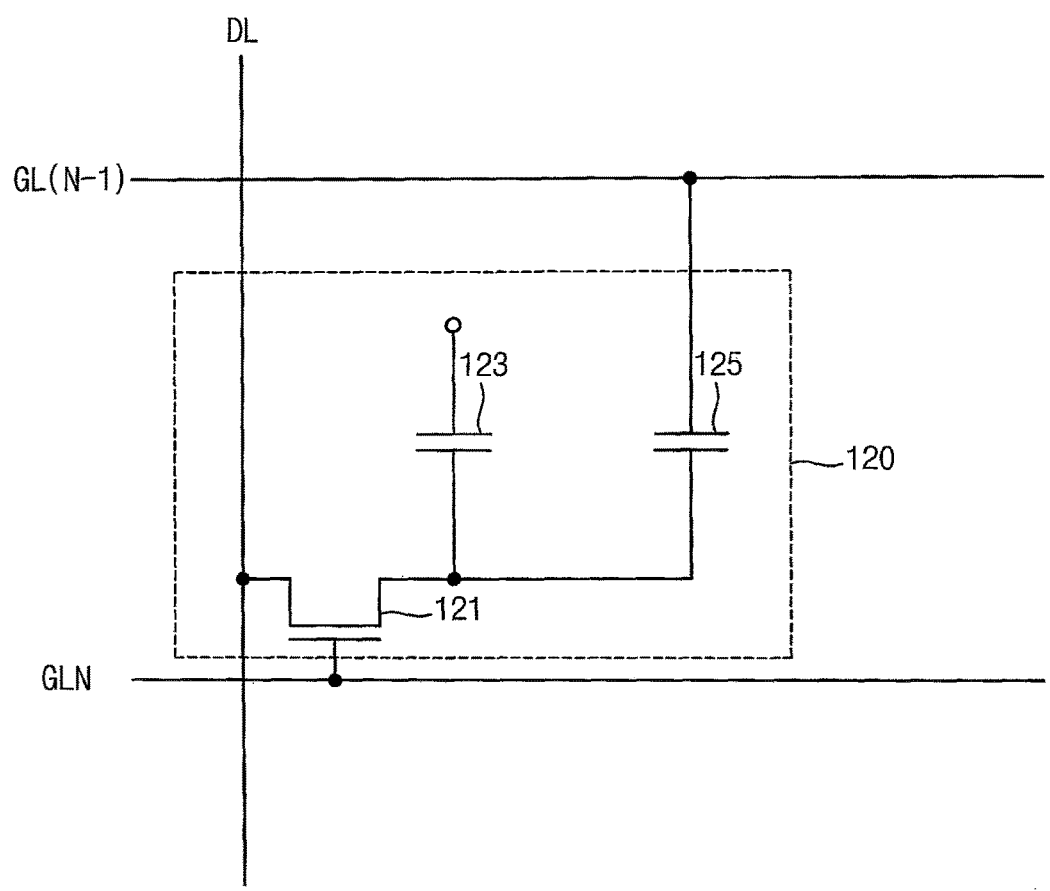
FIG. 2 is a circuit diagram illustrating a pixel of FIG. 1.

FIG. 2 is a circuit diagram illustrating the pixel 120 of FIG. 1.

Referring to FIGS. 1 and 2, each of the pixels 120 is defined by each of the first to K-th gate lines GL1, GL2, . . . , GL(K−1) and GLK and each of the data lines DL. Each of the pixels 120 is disposed between an (N−1)-th (N is a natural number equal to or greater than two) gate line GL(N−1) and an N-th gate line GLN. In an exemplary embodiment, the first gate line GL1 of the first to K-th gate lines GL1, GL2, . . . , GL(K−1) and GLK may be the (N−1)-th gate line GL(N−1), and the second gate line GL2 of the first to K-th gate lines GL1, GL2, . . . , GL(K−1) and GLK may be the N-th gate line GLN when N is two, for example. In the same manner, the (K−1)-th gate line GL(K−1) of the first to K-th gate lines GL1, GL2, . . . , GL(K−1) and GLK may be the (N−1)-th gate line GL(N−1), and the K-th gate line GLK of the first to K-th gate lines GL1, GL2, . . . , GL(K−1) and GLK may be the N-th gate line GLN when N is K, for example.

The pixel 120 may include a TFT 121, a liquid crystal capacitor 123 and a storage capacitor 125. The TFT 121 is electrically connected to the N-th gate line GLN and the data line DL. Specifically, the TFT 121 includes a gate electrode electrically connected to the N-th gate line GLN, a source electrode electrically connected to the data line DL, and a drain electrode electrically connected to the liquid crystal capacitor 123 and the storage capacitor 125. The liquid crystal capacitor 123 is electrically connected to the TFT 121. Specifically, the liquid crystal capacitor 123 is electrically connected to the drain electrode of the TFT 121. The storage capacitor 125 is electrically connected between the TFT 121 and the (N-1)-th gate line GL(N-1). Specifically, a first terminal of the storage capacitor 125 is electrically connected to the drain electrode of the TFT 121 and the liquid crystal capacitor 123, and a second terminal of the storage capacitor 125 is electrically connected to the (N-1)-th gate line GL(N-1). Thus, the (N-1)-th gate line GL(N-1) may function as a storage electrode.

Referring back to FIG. 1, the gate driving part 130, the data driving part 140 and the timing controlling part 150 may be defined as a display panel driving apparatus for driving the display panel 110.

The gate driving part 130 generates first to K-th gate signals GS1, GS2, . . . , GS(K-1) and GSK in response to a vertical start signal STV and a first clock signal CLK1 provided from the timing controlling part 150, and outputs the first to K-th gate signals GS1, GS2, . . . , GS(K-1) and GSK to the first to K-th gate lines GL1, GL2, . . . , GL(K-1) and GLK, respectively. In an exemplary embodiment, the gate driving part 130 may include a gate driver or a gate driving circuit, for example.

The gate driving part 130 includes a kickback compensating part 200. The kickback compensating part 200 may receive a gate on voltage VON, a first gate off voltage VOFF1 and a second gate off voltage VOFF2 from the voltage providing part 160, and may generate each of the first to K-th gate signals GS1, GS2, . . . , GS(K-1) and GSK using the gate on voltage VON, the first gate off voltage VOFF1 and the second gate off voltage VOFF2. Specifically, the kickback compensating part 200 controls each of the first to K-th gate signals GS1, GS2, . . . , GS(K-1) and GSK as the gate on voltage VON, the first gate off voltage VOFF1 and the second gate off voltage VOFF2 in response to a first gate control signal GCS1, a second gate control signal GCS2 and a third gate control signal GCS3.

The data driving part 140 receives image data DATA from the timing controlling part 150, generates the data signal DS using the image data DATA, and outputs the data signal DS to the data line DL in response to a horizontal start signal STH and a second clock signal CLK2 provided from the timing controlling part 150. The data driving part 140 may include a plurality of data driving integrated circuits 141 generating the data signal DS and outputting the data signal DS to the data line DL. In an exemplary embodiment, the data driving part 140 may include a data driver or a data driving circuit, for example.

The timing controlling part 150 receives input image data IDATA and a control signal CON from an outside. In an exemplary embodiment, input image data IDATA(R, G, B) for a red color pixel (R), a green color pixel (G) and a blue color pixel (B) may be applied to the timing controlling part 150, for example, but the invention is not limited thereto. In another exemplary embodiment, the input image data may include various other color image data. The control signal CON may include a horizontal synchronous signal Hsync, a vertical synchronous signal Vsync and a clock signal CLK. The timing controlling part 150 generates the horizontal start signal STH using the horizontal synchronous signal Hsync and outputs the horizontal start signal STH to the data driving part 140. In addition, the timing controlling part 150 generates the vertical start signal STV using the vertical synchronous signal Vsync and outputs the vertical start signal STV to the gate driving part 130. In addition, the timing controlling part 150 generates the first clock signal CLK1 and the second clock signal CLK2 using the clock signal CLK, outputs the first clock signal CLK1 to the gate driving part 130, and outputs the second clock signal CLK2 to the data driving part 140. In an exemplary embodiment, the timing controlling part 150 may include a timing controller or a timing controlling circuit, for example.

The voltage providing part 160 generates the gate on voltage VON, the first gate off voltage VOFF1 and the second gate off voltage VOFF2, and outputs the gate on voltage VON, the first gate off voltage VOFF1 and the second gate off voltage VOFF2 to the gate driving part 130.

The light source part 170 outputs light L to the display panel 110. In an exemplary embodiment, the light source part 170 may include a light emitting diode ("LED") generating the light L, for example.

Figure 3:
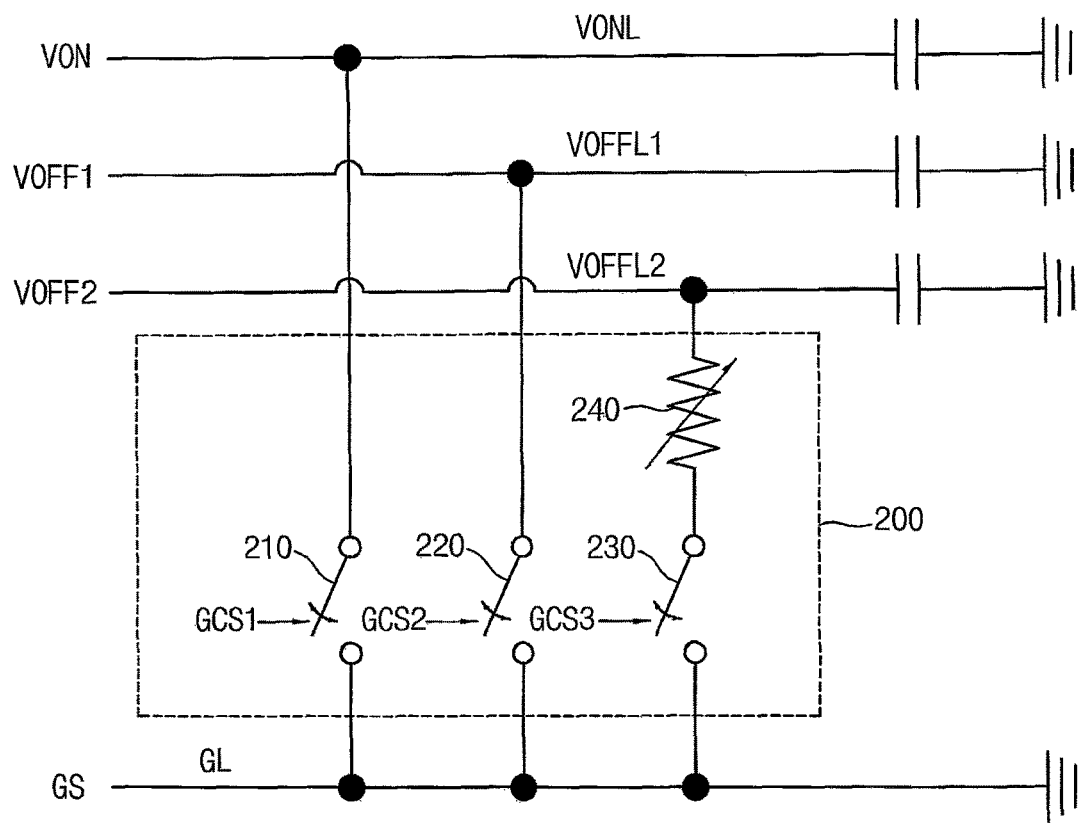
FIG. 3 is a circuit diagram illustrating a kickback compensating part of FIG. 1.

FIG. 3 is a circuit diagram illustrating the kickback compensating part 200 of FIG. 1.

Referring to FIGS. 1 and 3, the kickback compensating part 200 may include a first switch 210, a second switch 220, a third switch 230 and a variable resistor 240.

The gate on voltage VON output from the voltage providing part 160 is applied to a gate on voltage line VONL. The first gate off voltage VOFF1 output from the voltage providing part 160 is applied to a first gate off voltage line VOFFL1. The second gate off voltage VOFF2 output from the voltage providing part 160 is applied to a second gate off voltage line VOFFL2. The gate signal GS is applied to a gate line GL. Here, the gate line GL may be any of the first to K-th gate lines GL1, GL2, . . . , GL(K-1) and GLK. In addition, the gate signal GS may be a gate signal applied to any of the first to K-th gate lines GL1, GL2, . . . , GL(K-1) and GLK.

The first switch 210 is disposed between the gate on voltage line VONL and the gate line GL. The first switch 210 is closed or open in response to the first gate control signal GCS1. Thus, the first switch 210 electrically connects or disconnects the gate on voltage line VONL to or from the gate line GL in response to the first gate control signal GCS1.

The second switch 220 is disposed between the first gate off voltage line VOFFL1 and the gate line GL. The second switch 220 is closed or open in response to the second gate control signal GCS2. Thus, the second switch 220 electrically connects or disconnects the first gate off voltage line VOFFL1 to or from the gate line GL in response to the second gate control signal GCS2.

The variable resistor 240 is disposed between the second gate off voltage line VOFFL2 and the third switch 230.

The third switch 230 is disposed between the variable resistor 240 and the gate line GL. The third switch 230 is closed or open in response to the third gate control signal GCS3. Thus, the third switch 230 electrically connects or disconnects to the variable resistor 240 to or from the gate line GL.

Figure 4:
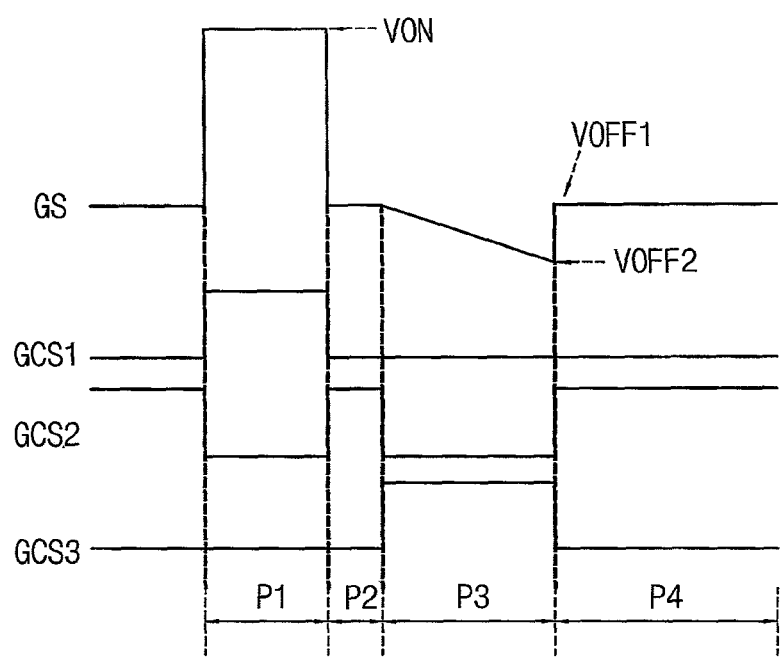
FIG. 4 is a timing diagram illustrating a gate signal, a first gate control signal, a second gate control signal and a third gate control signal of FIG. 3.

FIG. 4 is a timing diagram illustrating the gate signal GS, the first gate control signal GCS1, the second gate control signal GCS2 and the third gate control signal GCS3 of FIG. 3.

Referring to FIGS. 1, 3 and 4, the first gate control signal GCS1 is activated, the second gate control signal GCS2 is deactivated and the third gate control signal GCS3 is deactivated, during a first time period P1. Specifically, the first gate control signal GCS1 has a high level, the second gate control signal GCS2 has a low level and the third gate control signal GCS3 has the low level, during the first time period P1.

Therefore, the first switch 210 is closed in response to the first gate control signal GCS1, the second switch 220 is open in response to the second gate control signal GCS2 and the third switch 230 is open in response to the third gate control signal GCS3, during the first time period P1. Thus, the gate signal GS has the gate on voltage VON during the first time period P1.

The first gate control signal GCS1 is deactivated, the second gate control signal GCS2 is activated and the third gate control signal GCS3 is deactivated, during a second time period P2 following the first time period P1. Specifically, the first gate control signal GCS1 has the low level, the second gate control signal GCS2 has the high level and the third gate control signal GCS3 has the low level, during the second time period P2.

Therefore, the first switch 210 is open in response to the first gate control signal GCS1, the second switch 220 is closed in response to the second gate control signal GCS2 and the third switch 230 is open in response to the third gate control signal GCS3, during the second time period P2. Thus, the gate signal GS has the first gate off voltage VOFF1 during the second time period P2.

The first gate control signal GCS1 is deactivated, the second gate control signal GCS2 is deactivated and the third gate control signal GCS3 is activated, during a third time period P3 following the second time period P2. Specifically, the first gate control signal GCS1 has the low level, the second gate control signal GCS2 has the low level and the third gate control signal GCS3 has the high level, during the third time period P3.

Therefore, the first switch 210 is open in response to the first gate control signal GCS1, the second switch 220 is open in response to the second gate control signal GCS2 and the third switch 230 is closed in response to the third gate control signal GCS3, during the third time period P3. Thus, the gate signal GS gradually decreases from the first gate off voltage VOFF1 to the second gate off voltage VOFF2 during the third time period P3. In an exemplary embodiment, the third time period P3 in which the gate signal GS gradually decreases from the first gate off voltage VOFF1 to the second gate off voltage VOFF2 may be P (P is a natural number) horizontal time in which P gate line is driven, for example. In an exemplary embodiment, the third time period P3 may correspond to two horizontal times in which two gate lines are driven and thus two gate signals are activated, for example. However, the invention is not limited thereto, and in another exemplary embodiment, the number of horizontal times for which the gate signal GS gradually decreases from the first gate off voltage VOFF1 to the second gate off voltage VOFF2 may be different from two.

A slope of the gate signal GS, in which the gate signal GS gradually decreases from the first gate off voltage VOFF1 to the second gate off voltage VOFF2 during the third time period P3 is less than a slope of the gate signal GS in which the gate signal GS decreases from the gate on voltage VON to the first gate off voltage VOFF1. Specifically, the gate driving part 130 decreases the gate signal GS from the first gate off voltage VOFF1 to the second gate off voltage VOFF2 in the slope less than the slope in which the gate driving part 130 decreases the gate signal GS from the gate on voltage VON to the first gate off voltage VOFF1. Since the gate signal GS gradually decreases from the first gate off voltage VOFF1 to the second gate off voltage VOFF2, a charge coupling effect according to a level change from the first gate off voltage VOFF1 to the second gate off voltage VOFF2 may be decreased.

The slope of the gate signal GS which is gradually decreased from the first gate off voltage VOFF1 to the second gate off voltage VOFF2 may be controlled by a resistance of the variable resistor 240.

The first gate control signal GCS1 is deactivated, the second gate control signal GCS2 is activated and the third gate control signal GCS3 is deactivated, during a fourth time period P4 following the third time period P3. Specifically, the first gate control signal GCS1 has the low level, the second gate control signal GCS2 has the high level and the third gate control signal GCS3 has the low level, during the fourth time period P4.

Therefore, the first switch 210 is open in response to the first gate control signal GCS1, the second switch 220 is closed in response to the second gate control signal GCS2 and the third switch 230 is open in response to the third gate control signal GCS3, during the fourth time period P4. Thus, the gate signal GS has the first gate off voltage VOFF1 during the fourth time period P4.

FIG. 5 is a timing diagram illustrating an (N−1)-th gate signal GS(N−1) applied to the (N−1)-th gate line GL(N−1) of FIG. 2, an N-th gate signal GSN applied to the N-th gate line GLN of FIG. 2, and a pixel voltage PV charged in the pixel 120 of FIG. 2, by the display apparatus 100 of FIG. 1.

In an exemplary embodiment, the first gate signal GS1 and the second gate signal GS2 among the first to K-th gate signals GS1, GS2, . . . , GS(K−1) and GSK may be the (N−1)-th gate signal GS(N−1) and the N-th gate signal GSN, respectively, for example. In the same manner, the (K−1)-th gate signal GS(K−1) and the K-th gate signal GSK may be the (N−1)-th gate signal GS(N−1) and the N-th gate signal GSN, respectively.

Referring to FIGS. 1 to 5, the (N−1)-th gate signal GS(N−1) increases from the first gate off voltage VOFF1 to the gate on voltage VON at a first timing T1.

The (N−1)-th gate signal GS(N−1) decreases from the gate on voltage VON to the first gate off voltage VOFF1 at a second timing T2 after the first timing T1. In addition, the N-th gate signal GSN increases from the first gate off voltage VOFF1 to the gate on voltage VON at the second timing T2. Therefore, the TFT 121 electrically connected to the N-th gate line GLN turns on, and thus the pixel voltage PV increases from a first level LV1 to a second level LV2. The first level LV1 may be referred to as a low level and the second level LV2 may be referred to as a high level.

The N-th gate signal GSN decreases from the gate on voltage VON to the first gate off voltage VOFF1 at a third timing T3 after the second timing T2. Therefore, the pixel voltage PV decreases from the second level LV2 to a third level L3 due to a kickback voltage Vkb. Here, the third level LV3 is a level between the first level LV1 and the second level LV2.

The (N−1)-th gate signal GS(N−1) gradually decreases from the first gate off voltage VOFF1 to the second gate off voltage VOFF2 between the second timing T2 and a fourth timing T4 after the third timing T3. In an exemplary embodiment, the (N−1)-th gate signal GS(N−1) may gradually decrease from the first gate off voltage VOFF1 to the second gate off voltage VOFF2 during two horizontal times in which two gate lines are driven, for example. However, the invention is not limited thereto, and in another exemplary embodiment, the number of horizontal times for which the gate signal GS gradually decreases from the first gate off voltage VOFF1 to the second gate off voltage VOFF2 may be different from two. Since the (N−1)-th gate signal GS(N−1) gradually decreases from the first gate off voltage VOFF1 to the second gate off voltage VOFF2, the charge coupling effect according to the level change from the first gate off voltage VOFF1 to the second gate off voltage VOFF2 may be prevented, and a decrease of the pixel voltage PV due to the charge coupling effect may be prevented.

The (N−1)-th gate signal GS(N−1) increases from the second gate off voltage VOFF2 to the first gate off voltage VOFF1 at the fourth timing T4. Therefore, the pixel voltage PV increases from the third level LV3 to a fourth level LV4 by a first kickback compensation voltage Vkb_1 due to a charge coupling effect. Here, the fourth level LV4 is a level between the second level LV2 and the third level LV3.

The N-th gate signal GSN gradually decreases from the first gate off voltage VOFF1 to the second gate off voltage VOFF2 between the third timing T3 and a fifth timing T5 after the fourth timing T4. In an exemplary embodiment, the N-th gate signal GSN may gradually decrease from the first gate off voltage VOFF1 to the second gate off voltage VOFF2 during two horizontal times in which two gate lines are driven, for example. However, the invention is not limited thereto, and in another exemplary embodiment, the number of horizontal times for which the gate signal GS gradually decreases from the first gate off voltage VOFF1 to the second gate off voltage VOFF2 may be different from two. Since the N-th gate signal GSN gradually decreases from the first gate off voltage VOFF1 to the second gate off voltage VOFF2, the charge coupling effect according to the level change from the first gate off voltage VOFF1 to the second gate off voltage VOFF2 may be prevented, and the decrease of the pixel voltage PV due to the charge coupling effect may be prevented.

The N-th gate signal GSN increases from the second gate off voltage VOFF2 to the first gate off voltage VOFF1 at the fifth timing T5. Therefore, the pixel voltage PV increases from the fourth level LV4 to the second level LV2 by a second kickback compensation voltage Vkb_2 due to a charge coupling effect.

Thus, the pixel voltage PV decreased due to the kickback voltage Vkb may be compensated by the first kickback compensation voltage Vkb_1 and the second kickback compensation voltage Vkb_2.

Figure 6A:
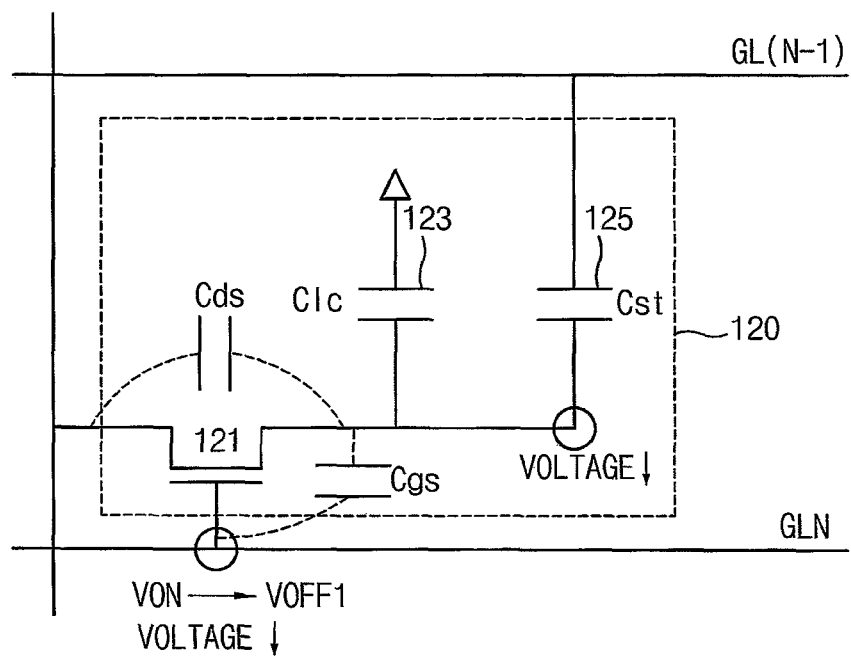
FIG. 6A is the circuit diagram illustrating the pixel of FIG. 2 for describing a kickback voltage of FIG. 5.

FIG. 6A is a circuit diagram illustrating the pixel 120 of FIG. 2 for describing the kickback voltage Vkb of FIG. 5.

Referring to FIGS. 1 to 6A, the N-th gate signal GSN applied to the N-th gate line GLN decreases from the gate on voltage VON to the first gate off voltage VOFF1 at the third timing T3. Therefore, a voltage of the gate electrode in the TFT 121 decreases from the gate on voltage VON to the first gate off voltage VOFF1. Thus, the pixel voltage PV between the TFT 121 and the storage capacitor 125 decreases due to the kickback voltage Vkb.

The kickback voltage Vkb may be calculated by [Equation 1].

$$Vkb = \frac{Cgs}{Clc + Cst + Cgs + Cds} \times (VON - VOFF1) \quad \text{[Equation 1]}$$

In [Equation 1], 'Vkb' denotes the kickback voltage, 'Clc' denotes a capacitance of the liquid crystal capacitor 123, 'Cst' denotes a capacitance of the storage capacitor 125, 'Cgs' denotes a capacitance between the gate electrode and the source electrode of the TFT 121, 'Cds' denotes a capacitance between the drain electrode and the source electrode of the TFT 121, 'VON' denotes the gate on voltage VON, and 'VOFF1' denotes the first gate off voltage VOFF1.

Figure 6B:
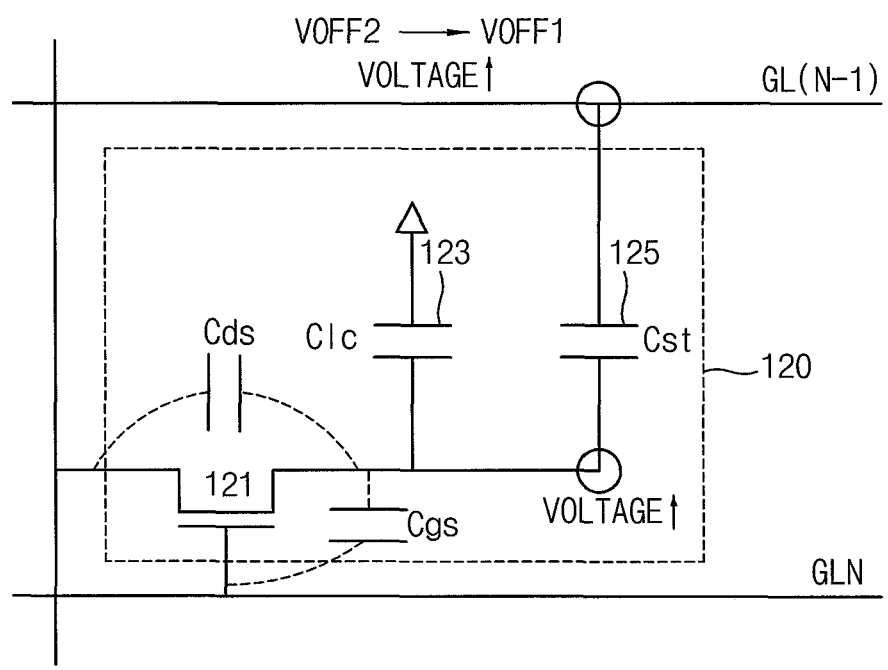
FIG. 6B is the circuit diagram illustrating the pixel of FIG. 2 for describing a first kickback compensation voltage of FIG. 5.

FIG. 6B is the circuit diagram illustrating the pixel 120 of FIG. 2 for describing the first kickback compensation voltage Vkb_1 of FIG. 5.

Referring to FIGS. 1 to 5 and 6B, the (N−1)-th gate signal GS(N−1) applied to the (N−1)-th gate line GL(N−1) increases from the second gate off voltage VOFF2 to the first gate off voltage VOFF1 at the fourth timing T4. Thus, the pixel voltage PV between the TFT 121 and the storage capacitor 125 increases by the first kickback compensation voltage Vkb_1.

The first kickback compensation voltage Vkb_1 may be calculated by [Equation 2].

$$Vkb\_C1 = \frac{Cst}{Clc + Cst + Cgs + Cds} \times (VOFF2 - VOFF1) \quad \text{[Equation 2]}$$

In [Equation 2], 'Vkb_C1' denotes the first kickback compensation voltage Vkb_1, 'Clc' denotes the capacitance of the liquid crystal capacitor 123, 'Cst' denotes the capacitance of the storage capacitor 125, 'Cgs' denotes the capacitance between the gate electrode and the source electrode of the TFT 121, 'Cds' denotes the capacitance between the drain electrode and the source electrode of the TFT 121, 'VOFF2' denotes the second gate off voltage VOFF2, and 'VOFF1' denotes the first gate off voltage VOFF1.

Figure 6C:
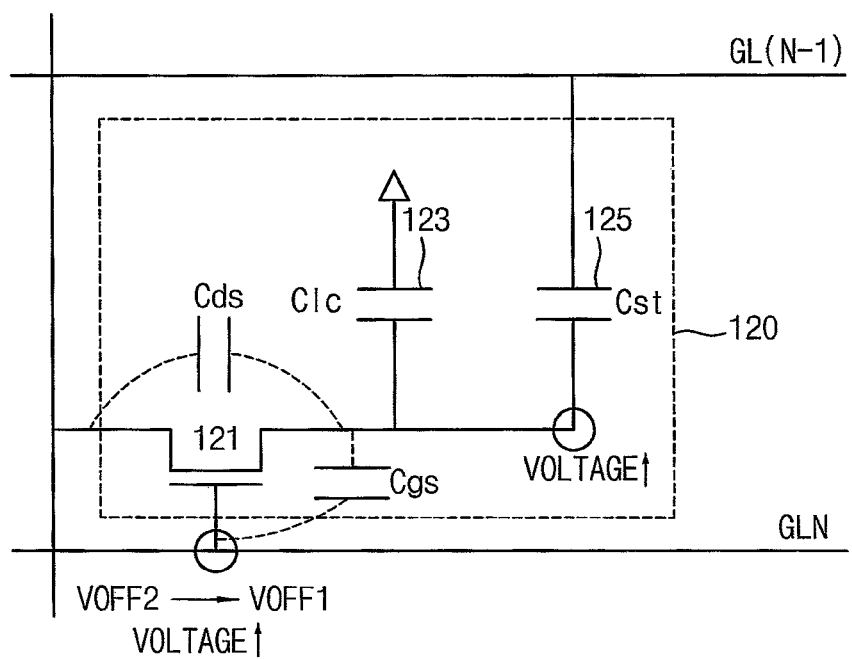
FIG. 6C is the circuit diagram illustrating the pixel of FIG. 2 for describing a second kickback compensation voltage of FIG. 5.

FIG. 6C is the circuit diagram illustrating the pixel 120 of FIG. 2 for describing the second kickback compensation voltage Vkb_2 of FIG. 5.

Referring to FIGS. 1 to 5 and 6C, the N-th gate signal GSN applied to the N-th gate line GLN increases from the second gate off voltage VOFF2 to the first gate off voltage VOFF1 at the fifth timing T5. Therefore, the voltage of the gate electrode in the TFT 121 increases from the second gate off voltage VOFF2 to the first gate off voltage VOFF1. Thus, the pixel voltage PV between the TFT 121 and the storage capacitor 125 increases by the second kickback compensation voltage Vkb_2.

The second kickback compensation voltage Vkb_2 may be calculated by [Equation 3].

$$Vkb\_C2 = \frac{Cgs}{Clc + Cst + Cgs + Cds} \times (VOFF2 - VOFF1) \quad \text{[Equation 3]}$$

In Equation 3, 'Vkb_C2' denotes the second kickback compensation voltage Vkb_2, 'Clc' denotes the capacitance of the liquid crystal capacitor 123, 'Cst' denotes the capacitance of the storage capacitor 125, 'Cgs' denotes the capacitance between the gate electrode and the source electrode of the TFT 121, 'Cds' denotes the capacitance between the drain electrode and the source electrode of the TFT 121, 'VOFF2' denotes the second gate off voltage VOFF2, and 'VOFF1' denotes the first gate off voltage VOFF1.

In the illustrated exemplary embodiment, the second gate off voltage VOFF2 may be determined according to the first gate off voltage VOFF1. In an exemplary embodiment, the second gate off voltage VOFF2 may be calculated by [Equation 4], [Equation 5] and [Equation 6], for example.

$$Vkb = Vkb\_C1 + Vkb\_C2 \quad \text{[Equation 4]}$$

$$(VON - VOFF1)*Cgs = (VOFF2 - VOFF1)*(Cgs + Cst) \quad \text{[Equation 5]}$$

$$VOFF2 - VOFF1 = (VON - VOFF1)*(Cgs/(Cgs + Cst)) \quad \text{[Equation 6]}$$

In [Equation 4], [Equation 5] and [Equation 6], 'Vkb' denotes the kickback voltage Vkb, 'Vkb_C1' denotes the first kickback compensation voltage Vkb_1, 'Vkb_C2' denotes the second kickback compensation voltage Vkb_2, 'VON' denotes the gate on voltage VON, 'VOFF1' denotes the first gate off voltage VOFF1, 'Cgs' denotes the capacitance between the gate electrode and the source electrode of the TFT 121, 'VOFF2' denotes the second gate off voltage VOFF2, and 'Cst' denotes the capacitance of the storage capacitor 125.

Figure 7:
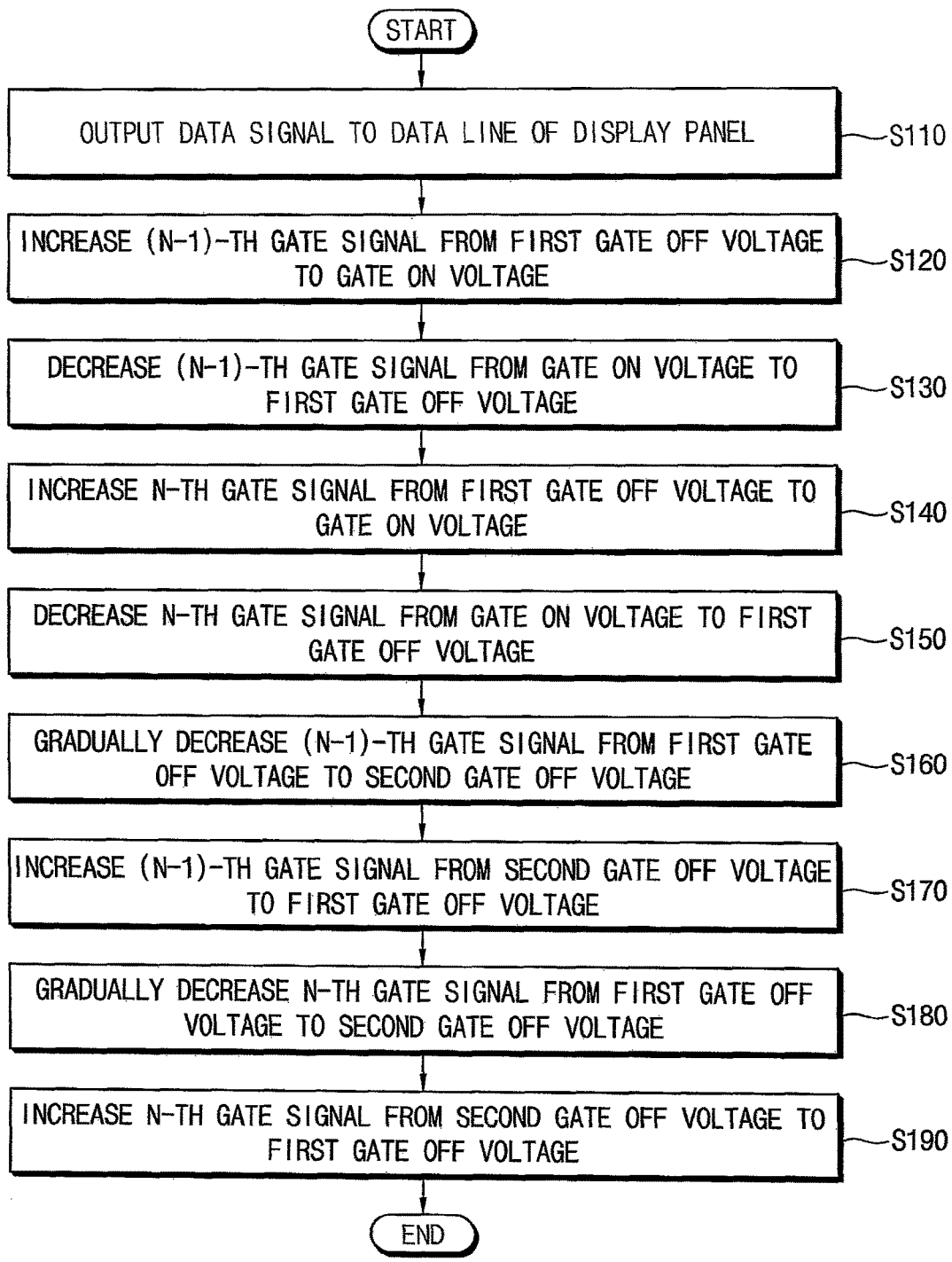
FIG. 7 is a flowchart illustrating a method of driving the display apparatus of FIG. 1.

FIG. 7 is a flowchart illustrating a method of driving the display apparatus 100 of FIG. 1.

Referring to FIGS. 1 to 7, the data signal DS is output to the data line DL of display panel 110 (operation S110). Specifically, the data driving part 140 receives the image data DATA from the timing controlling part 150, generates the data signal DS using the image data DATA, and outputs the data signal DS to the data line DL in response to the horizontal start signal STH and the second clock signal CLK2 provided from the timing controlling part 150.

The (N−1)-th gate signal GS(N−1) increases from the first gate off voltage VOFF1 to the gate on voltage VON (operation S120). Specifically, the gate driving part 130 increases the (N−1)-th gate signal GS(N−1) from the first gate off voltage VOFF1 to the gate on voltage VON at the first timing T1.

The (N−1)-th gate signal GS(N−1) decreases from the gate on voltage VON to the first gate off voltage VOFF1 (operation S130). Specifically, the gate driving part 130 decreases from the gate on voltage VON to the first gate off voltage VOFF1 at the second timing T2 after the first timing T1.

The N-th gate signal GSN increases from the first gate off voltage VOFF1 to the gate on voltage VON (operation S140). Specifically, the gate driving part 130 increases the N-th gate signal GSN from the first gate off voltage VOFF1 to the gate on voltage VON at the second timing T2. Therefore, the TFT 121 electrically connected to the N-th gate line GLN turns on, and thus the pixel voltage PV increases from the first level LV1 to the second level LV2. The first level LV1 may be referred to as the low level and the second level LV2 may be referred to as the high level.

The N-th gate signal GSN decreases from the gate on voltage VON to the first gate off voltage VOFF1 (operation S150). Specifically, the gate driving part 130 decreases the N-th gate signal GSN from the gate on voltage VON to the first gate off voltage VOFF1 at the third timing T3 after the second timing T2. Therefore, the pixel voltage PV decreases from the second level LV2 to the third level L3 due to the kickback voltage Vkb. Here, the third level LV3 is the level between the first level LV1 and the second level LV2.

The (N−1)-th gate signal GS(N−1) gradually decreases from the first gate off voltage VOFF1 to the second gate off voltage VOFF2 (operation S160). Specifically, the gate driving part 130 gradually decreases the (N−1)-th gate signal GS(N−1) between the second timing T2 and the fourth timing T4. In an exemplary embodiment, the gate driving part 130 may gradually decrease the (N−1)-th gate signal GS(N−1) from the first gate off voltage VOFF1 to the second gate off voltage VOFF2 during two horizontal times in which two gate lines are driven, for example. Since the gate driving part 130 gradually decreases the (N−1)-th gate signal GS(N−1) from the first gate off voltage VOFF1 to the second gate off voltage VOFF2, the charge coupling effect according to the level change from the first gate off voltage VOFF1 to the second gate off voltage VOFF2 may be prevented, and the decrease of the pixel voltage PV due to the charge coupling effect may be prevented.

The (N−1)-th gate signal GS(N−1) increases from the second gate off voltage VOFF2 to the first gate off voltage VOFF1 (operation S170). Specifically, the gate driving part 130 increases the (N−1)-th gate signal GS(N−1) from the second gate off voltage VOFF2 to the first gate off voltage VOFF1 at the fourth timing T4. Therefore, the pixel voltage PV increases from the third level LV3 to the fourth level LV4 by the first kickback compensation voltage Vkb_1 due to the charge coupling effect. Here, the fourth level LV4 is the level between the second level LV2 and the third level LV3.

The N-th gate signal GSN gradually decreases from the first gate off voltage VOFF1 to the second gate off voltage VOFF2 (operation S180). Specifically, the gate driving part 130 gradually decreases the N-th gate signal from the first gate off voltage VOFF1 to the second gate off voltage VOFF2 between the third timing T3 and the fifth timing T5. In an exemplary embodiment, the gate driving part 130 gradually decreases the N-th gate signal from the first gate off voltage VOFF1 to the second gate off voltage VOFF2 during two horizontal times in which two gate lines are driven. However, the invention is not limited thereto, and in another exemplary embodiment, the number of horizontal times for which the gate signal GS gradually decreases from the first gate off voltage VOFF1 to the second gate off voltage VOFF2 may be different from two. Since the gate driving part 130 gradually decreases the N-th gate signal from the first gate off voltage VOFF1 to the second gate off voltage VOFF2, the charge coupling effect according to the level change from the first gate off voltage VOFF1 to the second gate off voltage VOFF2 may be prevented, and the decrease of the pixel voltage PV due to the charge coupling effect may be prevented.

The N-th gate signal GSN increases from the second gate off voltage VOFF2 to the first gate off voltage VOFF1 (operation S190). Specifically, the gate driving part 130 increases the N-th gate signal GSN from the second gate off voltage VOFF2 to the first gate off voltage VOFF1 at the fifth timing T5. Therefore, the pixel voltage PV increases from the fourth level LV4 to the second level LV2 by the second kickback compensation voltage Vkb_2 due to the charge coupling effect.

Thus, the pixel voltage PV decreased due to the kickback voltage Vkb may be compensated by the first kickback compensation voltage Vkb_1 and the second kickback compensation voltage Vkb_2.

According to the illustrated exemplary embodiment, the pixel voltage PV decreased due to the kickback voltage Vkb may be compensated by the first kickback compensation voltage Vkb_1 and the second kickback compensation voltage Vkb_2. Therefore, a charge rate decrease of the pixel 120 may be prevented, and thus display quality of the display apparatus 100 may be improved.

Figure 8:
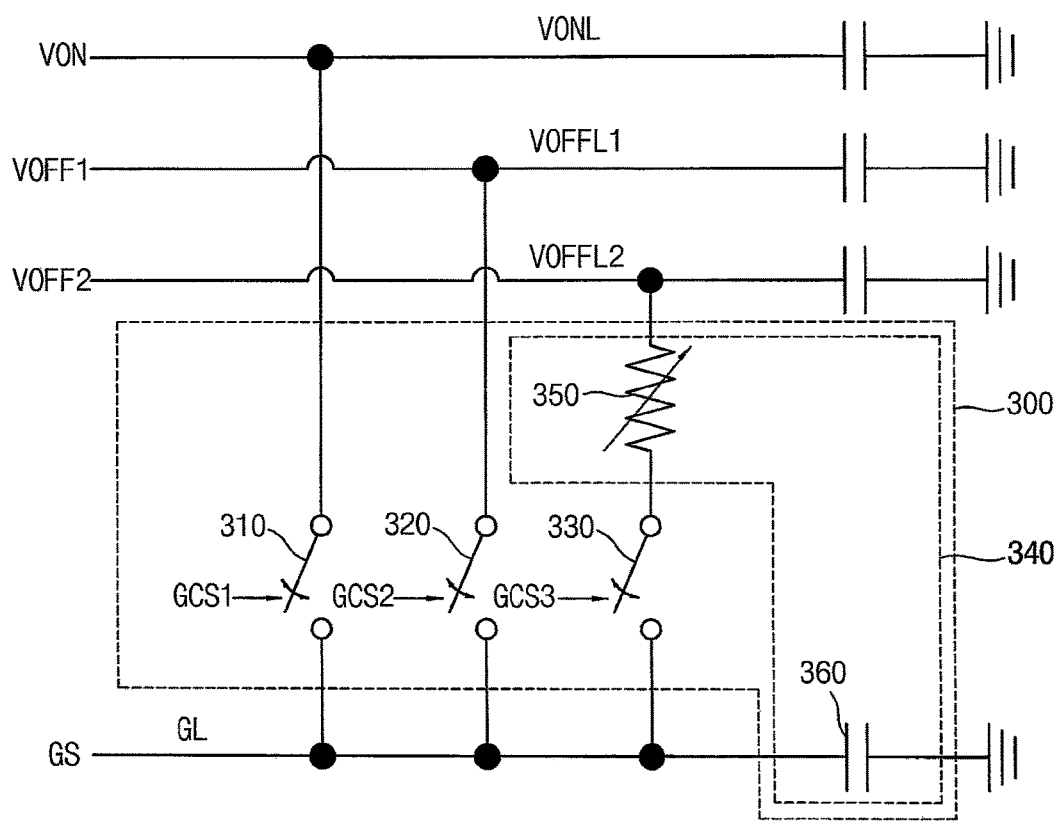
FIG. 8 is a circuit diagram illustrating an exemplary embodiment of a kickback compensating part according to the invention.

FIG. 8 is a circuit diagram illustrating a kickback compensating part 300 according to an exemplary embodiment of the invention.

The kickback compensating part 300 according to the exemplary embodiment illustrated in FIG. 8 may be included in the gate driving part 130 according to the previous exemplary embodiment illustrated in FIG. 1. In addition, a display apparatus including the kickback compensating part 300 according to the exemplary embodiment illustrated in FIG. 8 may be substantially the same as the display apparatus 100 according to the previous exemplary embodiment illustrated in FIG. 1 except for the kickback compensating part 300. Thus, the same reference numerals will be used to refer to same or like parts as those described in the previous exemplary embodiment and any further repetitive explanation concerning the above elements will be omitted.

Referring to FIGS. 1 and 8, the kickback compensating part 300 may include a first switch 310, a second switch 320, a third switch 330 and a low pass filter 340.

The gate on voltage VON output from the voltage providing part 160 is applied to the gate on voltage line VONL. The first gate off voltage VOFF1 output from the voltage providing part 160 is applied to the first gate off voltage line VOFFL1. The second gate off voltage VOFF2 output from the voltage providing part 160 is applied to the second gate off voltage line VOFFL2. The gate signal GS is applied to a gate line GL. Here, the gate line GL may be any of the first to K-th gate lines GL1, GL2, . . . , GL(K−1) and GLK. In addition, the gate signal GS may be any of the first to K-th gate signals GS1, GS2, . . . , GS(K−1) and GSK.

The first switch 310 is disposed between the gate on voltage line VONL and the gate line GL. The first switch 310 is closed or open in response to the first gate control signal GCS1. Thus, the first switch 310 electrically connects or disconnects the gate on voltage line VONL to or from the gate line GL in response to the first gate control signal GCS1.

The second switch 320 is disposed between the first gate off voltage line VOFFL1 and the gate line GL. The second switch 320 is closed or open in response to the second gate control signal GCS2. Thus, the second switch 320 electrically connects or disconnects the first gate off voltage line VOFFL1 to or from the gate line GL in response to the second gate control signal GCS2.

The low pass filter 340 may include a resistor 350 and a capacitor 360. The resistor 350 is disposed between the second gate off voltage line VOFFL2 and the third switch 330. The resistor 350 may be a variable resistor. The capacitor 360 is connected to the gate line GL. In an exemplary embodiment, the capacitor 360 may be a parasitic capacitance generated in the gate line GL, for example. In an alternative exemplary embodiment, the capacitor 360 may be a capacitor additionally installed in the gate line GL, for example.

The third switch 330 is disposed between the gate line GL and the resistor 350 of the low pass filter 340. The third switch 330 is closed or open in response to the third gate control signal GCS3. Thus, the third switch 330 electrically connects or disconnects the resistor 350 to or from the gate line GL in response to the third gate control signal GCS3.

A timing diagram illustrating the gate signal GS, the first gate control signal GCS1, the second gate control signal GCS2 and the third gate control signal GCS3 of FIG. 8 may be the same as the timing diagram illustrating the signal GS, the first gate control signal GCS1, the second gate control signal GCS2 and the third gate control signal GCS3 of FIG. 4.

Thus, referring to FIGS. 1, 4 and 8, the first gate control signal GCS1 is activated, the second gate control signal GCS2 is deactivated and the third gate control signal GCS3 is deactivated, during the first time period P1. Specifically, the first gate control signal GCS1 has the high level, the second gate control signal GCS2 has the low level and the third gate control signal GCS3 has the low level, during the first time period P1.

Therefore, the first switch 310 is closed in response to the first gate control signal GCS1, the second switch 320 is open in response to the second gate control signal GCS2 and the third switch 230 is open in response to the third gate control signal GCS3, during the first time period P1. Thus, the gate signal GS has the gate on voltage VON during the first time period P1.

The first gate control signal GCS1 is deactivated, the second gate control signal GCS2 is activated and the third gate control signal GCS3 is deactivated, during the second time period P2 following the first time period P1. Specifically, the first gate control signal GCS1 has the low level, the second gate control signal GCS2 has the high level and the third gate control signal GCS3 has the low level, during the second time period P2.

Therefore, the first switch 310 is open in response to the first gate control signal GCS1, the second switch 320 is closed in response to the second gate control signal GCS2 and the third switch 330 is open in response to the third gate control signal GCS3, during the second time period P2. Thus, the gate signal GS has the first gate off voltage VOFF1 during the second time period P2.

The first gate control signal GCS1 is deactivated, the second gate control signal GCS2 is deactivated and the third gate control signal GCS3 is activated, during the third time period P3 following the second time period P2. Specifically, the first gate control signal GCS1 has the low level, the second gate control signal GCS2 has the low level and the third gate control signal GCS3 has the high level, during the third time period P3.

Therefore, the first switch 310 is open in response to the first gate control signal GCS1, the second switch 320 is open in response to the second gate control signal GCS2 and the third switch 330 is closed in response to the third gate control signal GCS3, during the third time period P3. Thus, the gate signal GS gradually decreases from the first gate off voltage VOFF1 to the second gate off voltage VOFF2 during the third time period P3. In an exemplary embodiment, the third time period P3 in which the gate signal GS gradually decreases from the first gate off voltage VOFF1 to the second gate off voltage VOFF2 may correspond to two horizontal times in which two gate lines are driven and thus two gate signals are activated, for example. However, the invention is not limited thereto, and in another exemplary embodiment, the number of horizontal times for which the gate signal GS gradually decreases from the first gate off voltage VOFF1 to the second gate off voltage VOFF2 may be different from two.

The slope of the gate signal GS, in which the gate signal GS gradually decreases from the first gate off voltage VOFF1 to the second gate off voltage VOFF2 during the third time period P3 is less than the slope of the gate signal GS in which the gate signal GS decreases from the gate on voltage VON to the first gate off voltage VOFF1. Specifically, the gate driving part 130 decreases the gate signal GS from the first gate off voltage VOFF1 to the second gate off voltage VOFF2 in the slope less than the slope in which the gate driving part 130 decreases the gate signal GS from the gate on voltage VON to the first gate off voltage VOFF1. Since the gate signal GS gradually decreases from the first gate off voltage VOFF1 to the second gate off voltage VOFF2, the charge coupling effect according to the level change from the first gate off voltage VOFF1 to the second gate off voltage VOFF2 may be decreased.

The slope of the gate signal GS which is gradually decreased from the first gate off voltage VOFF1 to the second gate off voltage VOFF2 may be controlled by the low pass filter 340.

The first gate control signal GCS1 is deactivated, the second gate control signal GCS2 is activated and the third gate control signal GCS3 is deactivated, during the fourth time period P4 following the third time period P3. Specifically, the first gate control signal GCS1 has the low level, the second gate control signal GCS2 has the high level and the third gate control signal GCS3 has the low level, during the fourth time period P4.

Therefore, the first switch 310 is open in response to the first gate control signal GCS1, the second switch 320 is closed in response to the second gate control signal GCS2 and the third switch 330 is open in response to the third gate control signal GCS3, during the fourth time period P4. Thus, the gate signal GS has the first gate off voltage VOFF1 during the fourth time period P4.

A timing diagram illustrating the (N-1)-th gate signal GS(N-1), the N-th gate signal GSN and the pixel voltage PV controlled by the kickback compensating part 300 may be substantially the same as the timing diagram illustrating the (N-1)-th gate signal GS(N-1), the N-th gate signal GSN and the pixel voltage PV of FIG. 5.

Thus, referring to FIGS. 1, 4, 5 and 8, the (N-1)-th gate signal GS(N-1) increases from the first gate off voltage VOFF1 to the gate on voltage VON at the first timing T1.

The (N-1)-th gate signal GS(N-1) decreases from the gate on voltage VON to the first gate off voltage VOFF1 at the second timing T2 after the first timing T1. In addition, the N-th gate signal GSN increases from the first gate off voltage VOFF1 to the gate on voltage VON at the second timing T2. Therefore, the TFT 121 electrically connected to the N-th gate line GLN turns on, and thus the pixel voltage PV increases from the first level LV1 to the second level LV2. The first level LV1 may be referred to as the low level and the second level LV2 may be referred to as the high level.

The N-th gate signal GSN decreases from the gate on voltage VON to the first gate off voltage VOFF1 at the third timing T3 after the second timing T2. Therefore, the pixel voltage PV decreases from the second level LV2 to the third level L3 due to the kickback voltage Vkb. Here, the third level LV3 is the level between the first level LV1 and the second level LV2.

The (N-1)-th gate signal GS(N-1) gradually decreases from the first gate off voltage VOFF1 to the second gate off voltage VOFF2 between the second timing T2 and the fourth timing T4 after the third timing T3. In an exemplary embodiment, the (N-1)-th gate signal GS(N-1) may gradually decrease from the first gate off voltage VOFF1 to the second gate off voltage VOFF2 during two horizontal times in which two gate lines are driven, for example. However, the invention is not limited thereto, and in another exemplary embodiment, the number of horizontal times for which the gate signal GS gradually decreases from the first gate off voltage VOFF1 to the second gate off voltage VOFF2 may be different from two. Since the (N-1)-th gate signal GS(N-1) gradually decreases from the first gate off voltage VOFF1 to the second gate off voltage VOFF2, the charge coupling effect according to the level change from the first gate off voltage VOFF1 to the second gate off voltage VOFF2 may be prevented, and the decrease of the pixel voltage PV due to the charge coupling effect may be prevented.

The (N-1)-th gate signal GS(N-1) increases from the second gate off voltage VOFF2 to the first gate off voltage VOFF1 at the fourth timing T4. Therefore, the pixel voltage PV increases from the third level LV3 to the fourth level LV4 by the first kickback compensation voltage Vkb_1 due to the charge coupling effect. Here, the fourth level LV4 is the level between the second level LV2 and the third level LV3.

The N-th gate signal GSN gradually decreases from the first gate off voltage VOFF1 to the second gate off voltage VOFF2 between the third timing T3 and the fifth timing T5 after the fourth timing T4. In an exemplary embodiment, the N-th gate signal GSN may gradually decrease from the first gate off voltage VOFF1 to the second gate off voltage VOFF2 during two horizontal times in which two gate lines are driven, for example. However, the invention is not limited thereto, and in another exemplary embodiment, the number of horizontal times for which the gate signal GS gradually decreases from the first gate off voltage VOFF1 to the second gate off voltage VOFF2 may be different from two. Since the N-th gate signal GSN gradually decreases from the first gate off voltage VOFF1 to the second gate off voltage VOFF2, the charge coupling effect according to the level change from the first gate off voltage VOFF1 to the second gate off voltage VOFF2 may be prevented, and the decrease of the pixel voltage PV due to the charge coupling effect may be prevented.

The N-th gate signal GSN increases from the second gate off voltage VOFF2 to the first gate off voltage VOFF1 at the fifth timing T5. Therefore, the pixel voltage PV increases from the fourth level LV4 to the second level LV2 by the second kickback compensation voltage Vkb_2 due to the charge coupling effect.

Thus, the pixel voltage PV decreased due to the kickback voltage Vkb may be compensated by the first kickback compensation voltage Vkb_1 and the second kickback compensation voltage Vkb_2.

A method of driving the display apparatus including the kickback compensating part 300 of FIG. 8 may be substantially the same as the method of driving the display apparatus 100 according to the previous exemplary embodiment illustrated in FIG. 7. Therefore, detailed descriptions concerning the method of driving the display apparatus including the kickback compensating part 300 of FIG. 8 are omitted.

According to the illustrated exemplary embodiment, the pixel voltage PV decreased due to the kickback voltage Vkb may be compensated by the first kickback compensation voltage Vkb_1 and the second kickback compensation voltage Vkb_2. Therefore, a charge rate decrease of the pixel 120 may be prevented, and thus display quality of the display apparatus may be improved.

Figure 9:
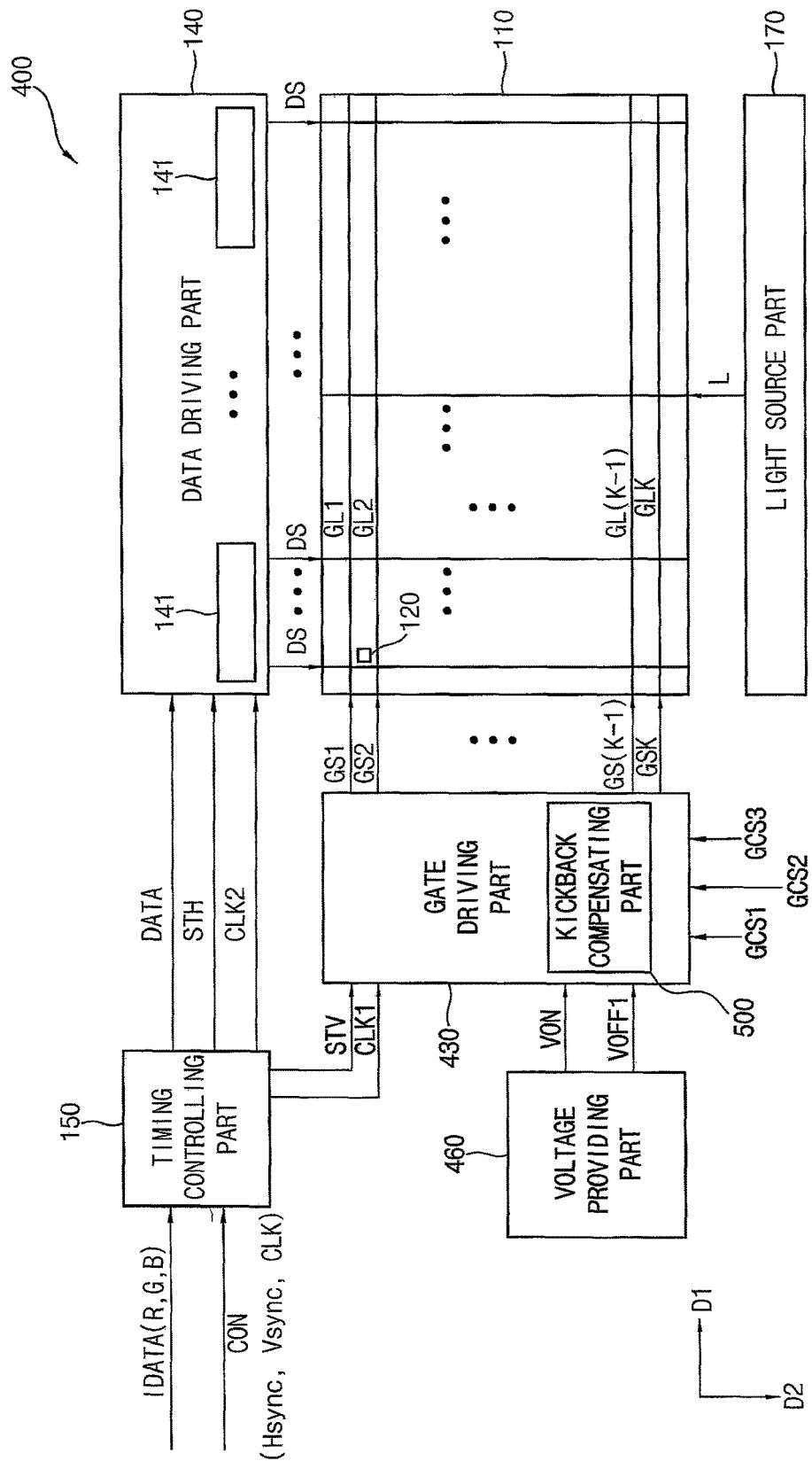
FIG. 9 is a block diagram illustrating an exemplary embodiment of a display apparatus according to the invention.

FIG. 9 is a block diagram illustrating a display apparatus 400 according to an exemplary embodiment of the invention.

The display apparatus 400 according to the exemplary embodiment illustrated in FIG. 9 may be substantially the same as the display apparatus 100 according to the exemplary embodiment illustrated in FIG. 1 except for a gate driving part 430, a voltage providing part 460 and a kickback compensating part 500. Thus, the same reference numerals will be used to refer to same or like parts as those described in the previous exemplary embodiment and any further repetitive explanation concerning the above elements will be omitted.

Referring to FIG. 9, the display apparatus 400 according to the illustrated exemplary embodiment includes the display panel 110, the gate driving part 430, the data driving part 140, the timing controlling part 150, the voltage providing part 460 and the light source part 170.

The gate driving part 430, the data driving part 140 and the timing controlling part 150 may be defined as a display panel driving apparatus for driving the display panel 110.

The gate driving part 430 generates the first to K-th gate signals GS1, GS2, GS(K-1) and GSK in response to the vertical start signal STV and the first clock signal CLK1 provided from the timing controlling part 150, and outputs the first to K-th gate signals GS1, GS2, . . . , GS(K−1) and GSK to the first to K-th gate lines GL1, GL2, . . . , GL(K−1) and GLK, respectively.

The gate driving part 430 includes the kickback compensating part 500. The kickback compensating part 500 may receive the gate on voltage VON and the first gate off voltage VOFF1 from the voltage providing part 460, and may generate each of the first to K-th gate signals GS1, GS2, . . . , GS(K−1) and GSK using the gate on voltage VON and the first gate off voltage VOFF1. Specifically, the kickback compensating part 500 controls each of the first to K-th gate signals GS1, GS2, . . . , GS(K−1) and GSK as the gate on voltage VON, the first gate off voltage VOFF1 and the second gate off voltage VOFF2 (shown in FIGS. 11 and 12) less than the first gate off voltage VOFF1 in response to the first gate control signal GCS1, the second gate control signal GCS2 and the third gate control signal GCS3.

The timing controlling part 150 generates the vertical start signal STV using the vertical synchronous signal Vsync and outputs the vertical start signal STV to the gate driving part 430. In addition, the timing controlling part 150 generates the first clock signal CLK1 and the second clock signal CLK2 using the clock signal CLK, outputs the first clock signal CLK1 to the gate driving part 430, and outputs the second clock signal CLK2 to the data driving part 140.

The voltage providing part 460 generates the gate on voltage VON and the first gate off voltage VOFF1, and outputs the gate on voltage VON and the first gate off voltage VOFF1 to the gate driving part 430.

Figure 10:
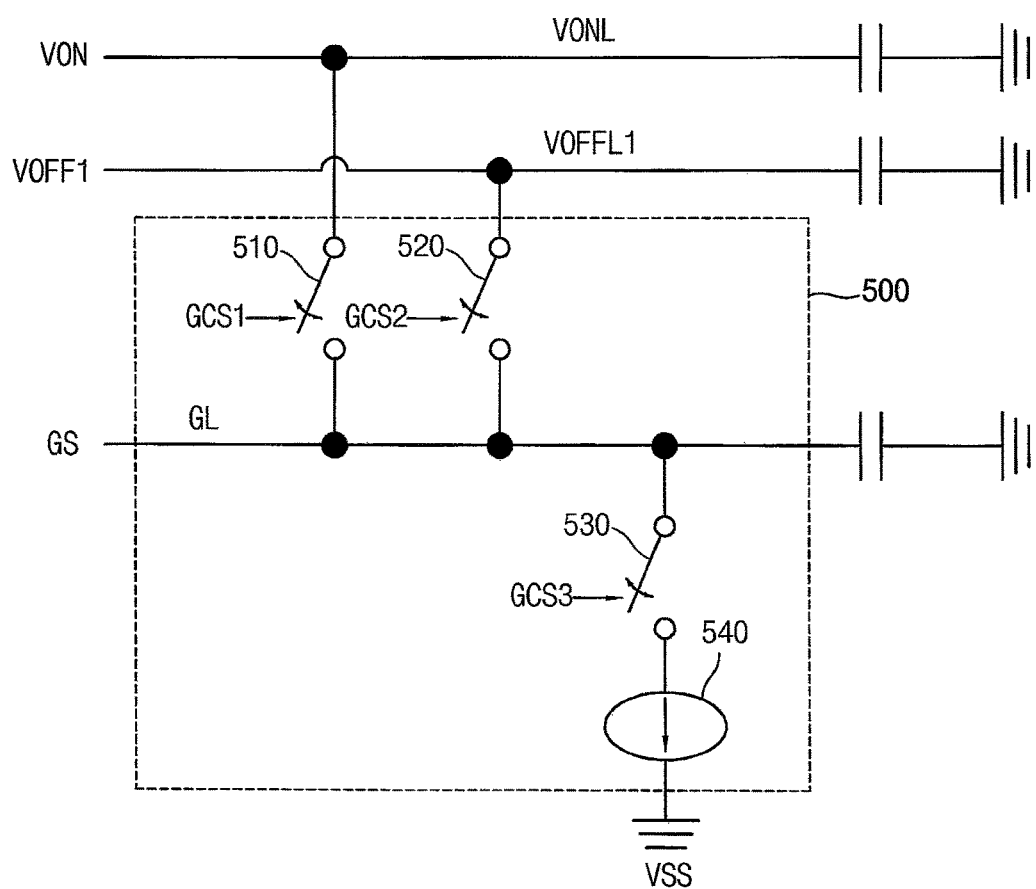
FIG. 10 is a circuit diagram illustrating a kickback compensating part of FIG. 9.

FIG. 10 is a circuit diagram illustrating the kickback compensating part 500 of FIG. 9.

Referring to FIGS. 9 and 10, the kickback compensating part 500 may include a first switch 510, a second switch 520, a third switch 530 and a current source 540.

The gate on voltage VON output from the voltage providing part 460 is applied to the gate on voltage line VONL. The first gate off voltage VOFF1 output from the voltage providing part 460 is applied to the first gate off voltage line VOFFL1.

The gate signal GS is applied to the gate line GL. Here, the gate line GL may be any of the first to K-th gate lines GL1, GL2, . . . , GL(K−1) and GLK. In addition, the gate signal GS may be a gate signal applied to any of the first to K-th gate lines GL1, GL2, . . . , GL(K−1) and GLK.

The first switch 510 is disposed between the gate on voltage line VONL and the gate line GL. The first switch 510 is closed or open in response to the first gate control signal GCS1. Thus, the first switch 510 electrically connects or disconnects the gate on voltage line VONL to or from the gate line GL in response to the first gate control signal GCS1.

The second switch 520 is disposed between the first gate off voltage line VOFFL1 and the gate line GL. The second switch 520 is closed or open in response to the second gate control signal GCS2. Thus, the second switch 520 electrically connects or disconnects the first gate off voltage line VOFFL1 to or from the gate line GL in response to the second gate control signal GCS2.

The current source 540 is disposed between the third switch 530 and a terminal to which a ground voltage VSS is applied.

The third switch 530 is disposed between the current source 540 and the gate line GL. The third switch 530 is closed or open in response to the third gate control signal GCS3. Thus, the third switch 530 electrically connects or disconnects to the current source 540 to or from the gate line GL.

Figure 11:
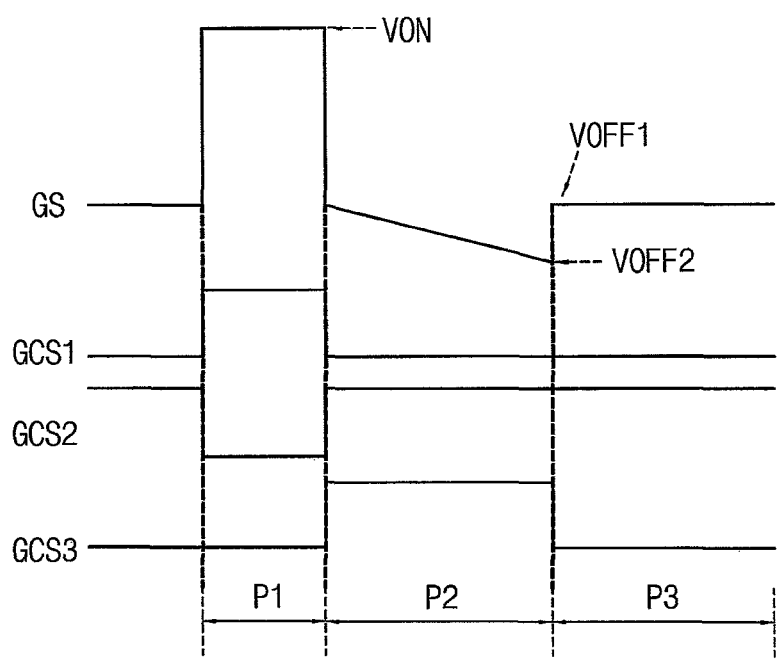
FIG. 11 is a timing diagram illustrating a gate signal, a first gate control signal, a second gate control signal and a third gate control signal of FIG. 10.

FIG. 11 is a timing diagram illustrating the gate signal GS, the first gate control signal GCS1, the second gate control signal GCS2 and the third gate control signal GCS3 of FIG. 10.

Referring to FIGS. 2, 6A to 6C and 9 to 11, the first gate control signal GCS1 is activated, the second gate control signal GCS2 is deactivated and the third gate control signal GCS3 is deactivated, during a first time period P1. Specifically, the first gate control signal GCS1 has a high level, the second gate control signal GCS2 has a low level and the third gate control signal GCS3 has the low level, during the first time period P1.

Therefore, the first switch 510 is closed in response to the first gate control signal GCS1, the second switch 520 is open in response to the second gate control signal GCS2 and the third switch 530 is open in response to the third gate control signal GCS3, during the first time period P1. Thus, the gate signal GS has the gate on voltage VON during the first time period P1.

The first gate control signal GCS1 is deactivated, the second gate control signal GCS2 is activated and the third gate control signal GCS3 is activated, during a second time period P2 following the first time period P1. Specifically, the first gate control signal GCS1 has the low level, the second gate control signal GCS2 has the high level and the third gate control signal GCS3 has the high level, during the second time period P2.

Therefore, the first switch 510 is open in response to the first gate control signal GCS1, the second switch 520 is closed in response to the second gate control signal GCS2 and the third switch 230 is closed in response to the third gate control signal GCS3, during the second time period P2. Thus, the gate signal GS has the first gate off voltage VOFF1 at an initial time of the second time period P2.

The gate signal GS gradually decreases from the first gate off voltage VOFF1 to the second gate off voltage VOFF2. In an exemplary embodiment, the third time period P3 in which the gate signal GS gradually decreases from the first gate off voltage VOFF1 to the second gate off voltage VOFF2 may correspond to two horizontal times in which two gate lines are driven and thus two gate signals are activated, for example. However, the invention is not limited thereto, and in another exemplary embodiment, the number of horizontal times for which the gate signal GS gradually decreases from the first gate off voltage VOFF1 to the second gate off voltage VOFF2 may be different from two.

A slope of the gate signal GS, in which the gate signal GS gradually decreases from the first gate off voltage VOFF1 to the second gate off voltage VOFF2 during the second time period P2 is less than a slope of the gate signal GS in which the gate signal GS decreases from the gate on voltage VON to the first gate off voltage VOFF1. Specifically, the gate driving part 430 decreases the gate signal GS from the first gate off voltage VOFF1 to the second gate off voltage VOFF2 in the slope less than the slope in which the gate driving part 430 decreases the gate signal GS from the gate on voltage VON to the first gate off voltage VOFF1. Since the gate signal GS gradually decreases from the first gate off voltage VOFF1 to the second gate off voltage VOFF2, the charge coupling effect according to the level change from the first gate off voltage VOFF1 to the second gate off voltage VOFF2 may be decreased.

The slope of the gate signal GS which is gradually decreased from the first gate off voltage VOFF1 to the second gate off voltage VOFF2 may be controlled by a current of the current source 540.

The first gate control signal GCS1 is deactivated, the second gate control signal GCS2 is activated and the third gate control signal GCS3 is deactivated, during a third time period P3 following the second time period P2. Specifically, the first gate control signal GCS1 has the low level, the second gate control signal GCS2 has the high level and the third gate control signal GCS3 has the low level, during the third time period P3.

Therefore, the first switch 510 is open in response to the first gate control signal GCS1, the second switch 520 is closed in response to the second gate control signal GCS2 and the third switch 530 is open in response to the third gate control signal GCS3, during the third time period P3. Thus, the gate signal GS has the first gate off voltage VOFF1 during the third time period P3.

Figure 12:
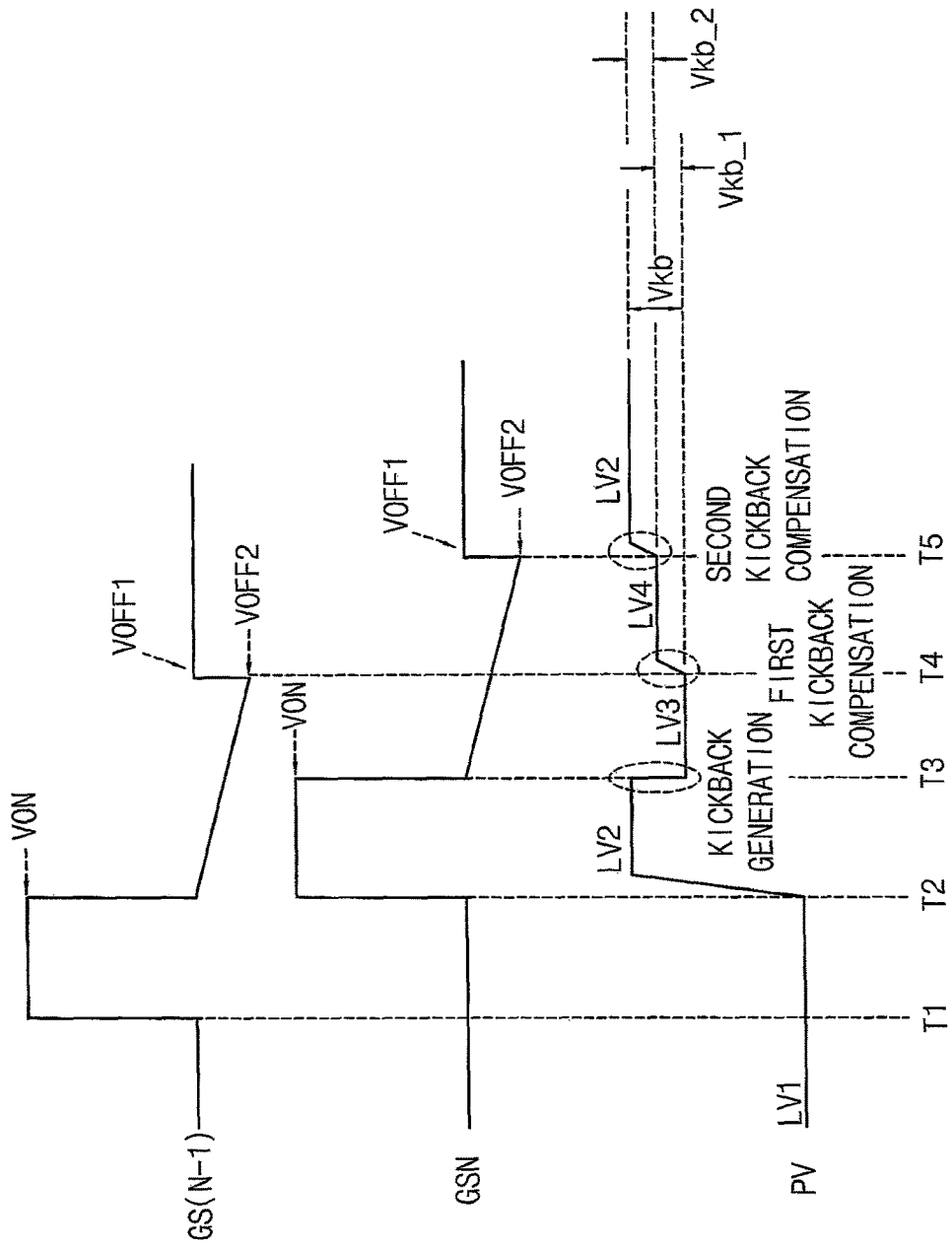
FIG. 12 is a timing diagram illustrating an (N−1)-th gate signal applied to an (N−1)-th gate line of FIG. 2, an N-th gate signal applied to an N-th gate line of FIG. 2, and a pixel voltage charged in the pixel of FIG. 2, by the display apparatus of FIG. 9.

FIG. 12 is a timing diagram illustrating an (N−1)-th gate signal GS(N−1) applied to the (N−1)-th gate line GL(N−1) of FIG. 2, an N-th gate signal GSN applied to the N-th gate line GLN of FIG. 2, and a pixel voltage PV charged in the pixel 120 of FIG. 2, by the display apparatus 400 of FIG. 9.

In an exemplary embodiment, the first gate signal GS1 and the second gate signal GS2 among the first to K-th gate signals GS1, GS2, . . . , GS(K−1) and GSK may be the (N−1)-th gate signal GS(N−1) and the N-th gate signal GSN, respectively, for example. In the same manner, the (K−1)-th gate signal GS(K−1) and the K-th gate signal GSK may be the (N−1)-th gate signal GS(N−1) and the N-th gate signal GSN, respectively.

In addition, the pixel voltage PV may be a voltage charged in the pixel 120 of FIGS. 2 and 9.

Referring to FIGS. 2, 6A to 6C and 9 to 12, the (N−1)-th gate signal GS(N−1) increases from the first gate off voltage VOFF1 to the gate on voltage VON at a first timing T1.

The (N−1)-th gate signal GS(N−1) decreases from the gate on voltage VON to the first gate off voltage VOFF1 at a second timing T2 after the first timing T1. In addition, the N-th gate signal GSN increases from the first gate off voltage VOFF1 to the gate on voltage VON at the second timing T2. Therefore, the TFT 121 electrically connected to the N-th gate line GLN turns on, and thus the pixel voltage PV increases from a first level LV1 to a second level LV2. The first level LV1 may be referred to as a low level and the second level LV2 may be referred to as a high level.

The N-th gate signal GSN decreases from the gate on voltage VON to the first gate off voltage VOFF1 at a third timing T3 after the second timing T2. Therefore, the pixel voltage PV decreases from the second level LV2 to a third level L3 due to a kickback voltage Vkb. Here, the third level LV3 is a level between the first level LV1 and the second level LV2.

The (N−1)-th gate signal GS(N−1) gradually decreases from the first gate off voltage VOFF1 to the second gate off voltage VOFF2 between the second timing T2 and a fourth timing T4 after the third timing T3. In an exemplary embodiment, the (N−1)-th gate signal GS(N−1) may gradually decrease from the first gate off voltage VOFF1 to the second gate off voltage VOFF2 during two horizontal times in which two gate lines are driven, for example. However, the invention is not limited thereto, and in another exemplary embodiment, the number of horizontal times for which the gate signal GS gradually decreases from the first gate off voltage VOFF1 to the second gate off voltage VOFF2 may be different from two. Since the (N−1)-th gate signal GS(N−1) gradually decreases from the first gate off voltage VOFF1 to the second gate off voltage VOFF2, the charge coupling effect according to the level change from the first gate off voltage VOFF1 to the second gate off voltage VOFF2 may be prevented, and a decrease of the pixel voltage PV due to the charge coupling effect may be prevented.

The (N−1)-th gate signal GS(N−1) increases from the second gate off voltage VOFF2 to the first gate off voltage VOFF1 at the fourth timing T4. Therefore, the pixel voltage PV increases from the third level LV3 to a fourth level LV4 by a first kickback compensation voltage Vkb_1 due to a charge coupling effect. Here, the fourth level LV4 is a level between the second level LV2 and the third level LV3.

The N-th gate signal GSN gradually decreases from the first gate off voltage VOFF1 to the second gate off voltage VOFF2 between the third timing T3 and a fifth timing T5 after the fourth timing T4. In an exemplary embodiment, the N-th gate signal GSN may gradually decrease from the first gate off voltage VOFF1 to the second gate off voltage VOFF2 during two horizontal times in which two gate lines are driven, for example. However, the invention is not limited thereto, and in another exemplary embodiment, the number of horizontal times for which the gate signal GS gradually decreases from the first gate off voltage VOFF1 to the second gate off voltage VOFF2 may be different from two. Since the N-th gate signal GSN gradually decreases from the first gate off voltage VOFF1 to the second gate off voltage VOFF2, the charge coupling effect according to the level change from the first gate off voltage VOFF1 to the second gate off voltage VOFF2 may be prevented, and the decrease of the pixel voltage PV due to the charge coupling effect may be prevented.

The N-th gate signal GSN increases from the second gate off voltage VOFF2 to the first gate off voltage VOFF1 at the fifth timing T5. Therefore, the pixel voltage PV increases from the fourth level LV4 to the second level LV2 by a second kickback compensation voltage Vkb_2 due to a charge coupling effect.

Thus, the pixel voltage PV decreased due to the kickback voltage Vkb may be compensated by the first kickback compensation voltage Vkb_1 and the second kickback compensation voltage Vkb_2.

In the illustrated exemplary embodiment, the second gate off voltage VOFF2 may be determined according to the first gate off voltage VOFF1. In an exemplary embodiment, the second gate off voltage VOFF2 may be calculated by [Equation 4], [Equation 5] and [Equation 6] according to the previous exemplary embodiment.

In addition, the second gate off voltage VOFF2 may be determined according to the current of the current source 540 and a pulse width of the second gate control signal GCS2. Specifically, the second gate off voltage VOFF2 may decrease according to an increase of the current of the current source 540. In addition, the second gate off voltage VOFF2 may decrease according to an increase of the pulse width of the second gate control signal GCS2.

The method of driving the display apparatus 400 may be substantially the same as the method of driving the display apparatus 100 according to the previous exemplary embodiment illustrated in FIG. 7.

Referring to FIGS. 2, 7 and 9 to 12, the data signal DS is output to the data line DL of display panel 110 (operation S110). Specifically, the data driving part 140 receives the image data DATA from the timing controlling part 150, generates the data signal DS using the image data DATA, and outputs the data signal DS to the data line DL in response to the horizontal start signal STH and the second clock signal CLK2 provided from the timing controlling part 150.

The (N−1)-th gate signal GS(N−1) increases from the first gate off voltage VOFF1 to the gate on voltage VON (operation S120). Specifically, the gate driving part 430 increases the (N−1)-th gate signal GS(N−1) from the first gate off voltage VOFF1 to the gate on voltage VON at the first timing T1.

The (N−1)-th gate signal GS(N−1) decreases from the gate on voltage VON to the first gate off voltage VOFF1 (operation S130). Specifically, the gate driving part 430 decreases from the gate on voltage VON to the first gate off voltage VOFF1 at the second timing T2 after the first timing T1.

The N-th gate signal GSN increases from the first gate off voltage VOFF1 to the gate on voltage VON (operation S140). Specifically, the gate driving part 130 increases the N-th gate signal GSN from the first gate off voltage VOFF1 to the gate on voltage VON at the second timing T2. Therefore, the TFT 121 electrically connected to the N-th gate line GLN turns on, and thus the pixel voltage PV increases from the first level LV1 to the second level LV2. The first level LV1 may be referred to as the low level and the second level LV2 may be referred to as the high level.

The N-th gate signal GSN decreases from the gate on voltage VON to the first gate off voltage VOFF1 (operation S150). Specifically, the gate driving part 430 decreases the N-th gate signal GSN from the gate on voltage VON to the first gate off voltage VOFF1 at the third timing T3 after the second timing T2. Therefore, the pixel voltage PV decreases from the second level LV2 to the third level L3 due to the kickback voltage Vkb. Here, the third level LV3 is the level between the first level LV1 and the second level LV2.

The (N−1)-th gate signal GS(N−1) gradually decreases from the first gate off voltage VOFF1 to the second gate off voltage VOFF2 (operation S160). Specifically, the gate driving part 430 gradually decreases the (N−1)-th gate signal GS(N−1) between the second timing T2 and the fourth timing T4. In an exemplary embodiment, the gate driving part 430 may gradually decrease the (N−1)-th gate signal GS(N−1) from the first gate off voltage VOFF1 to the second gate off voltage VOFF2 during two horizontal times in which two gate lines are driven, for example. However, the invention is not limited thereto, and in another exemplary embodiment, the number of horizontal times for which the gate signal GS gradually decreases from the first gate off voltage VOFF1 to the second gate off voltage VOFF2 may be different from two. Since the gate driving part 430 gradually decreases the (N−1)-th gate signal GS(N−1) from the first gate off voltage VOFF1 to the second gate off voltage VOFF2, the charge coupling effect according to the level change from the first gate off voltage VOFF1 to the second gate off voltage VOFF2 may be prevented, and the decrease of the pixel voltage PV due to the charge coupling effect may be prevented.

The (N−1)-th gate signal GS(N−1) increases from the second gate off voltage VOFF2 to the first gate off voltage VOFF1 (operation S170). Specifically, the gate driving part 430 increases the (N−1)-th gate signal GS(N−1) from the second gate off voltage VOFF2 to the first gate off voltage VOFF1 at the fourth timing T4. Therefore, the pixel voltage PV increases from the third level LV3 to the fourth level LV4 by the first kickback compensation voltage Vkb_1 due to the charge coupling effect. Here, the fourth level LV4 is the level between the second level LV2 and the third level LV3.

The N-th gate signal GSN gradually decreases from the first gate off voltage VOFF1 to the second gate off voltage VOFF2 (operation S180). Specifically, the gate driving part 430 gradually decreases the N-th gate signal from the first gate off voltage VOFF1 to the second gate off voltage VOFF2 between the third timing T3 and the fifth timing T5.

In an exemplary embodiment, the gate driving part 430 gradually decreases the N-th gate signal from the first gate off voltage VOFF1 to the second gate off voltage VOFF2 during two horizontal times in which two gate lines are driven. However, the invention is not limited thereto, and in another exemplary embodiment, the number of horizontal times for which the gate signal GS gradually decreases from the first gate off voltage VOFF1 to the second gate off voltage VOFF2 may be different from two. Since the gate driving part 430 gradually decreases the N-th gate signal from the first gate off voltage VOFF1 to the second gate off voltage VOFF2, the charge coupling effect according to the level change from the first gate off voltage VOFF1 to the second gate off voltage VOFF2 may be prevented, and the decrease of the pixel voltage PV due to the charge coupling effect may be prevented.

The N-th gate signal GSN increases from the second gate off voltage VOFF2 to the first gate off voltage VOFF1 (operation S190). Specifically, the gate driving part 430 increases the N-th gate signal GSN from the second gate off voltage VOFF2 to the first gate off voltage VOFF1 at the fifth timing T5. Therefore, the pixel voltage PV increases from the fourth level LV4 to the second level LV2 by the second kickback compensation voltage Vkb_2 due to the charge coupling effect.

Thus, the pixel voltage PV decreased due to the kickback voltage Vkb may be compensated by the first kickback compensation voltage Vkb_1 and the second kickback compensation voltage Vkb_2.

According to the illustrated exemplary embodiment, the pixel voltage PV decreased due to the kickback voltage Vkb may be compensated by the first kickback compensation voltage Vkb_1 and the second kickback compensation voltage Vkb_2. Therefore, a charge rate decrease of the pixel 120 may be prevented, and thus display quality of the display apparatus 400 may be improved.

Figure 13:
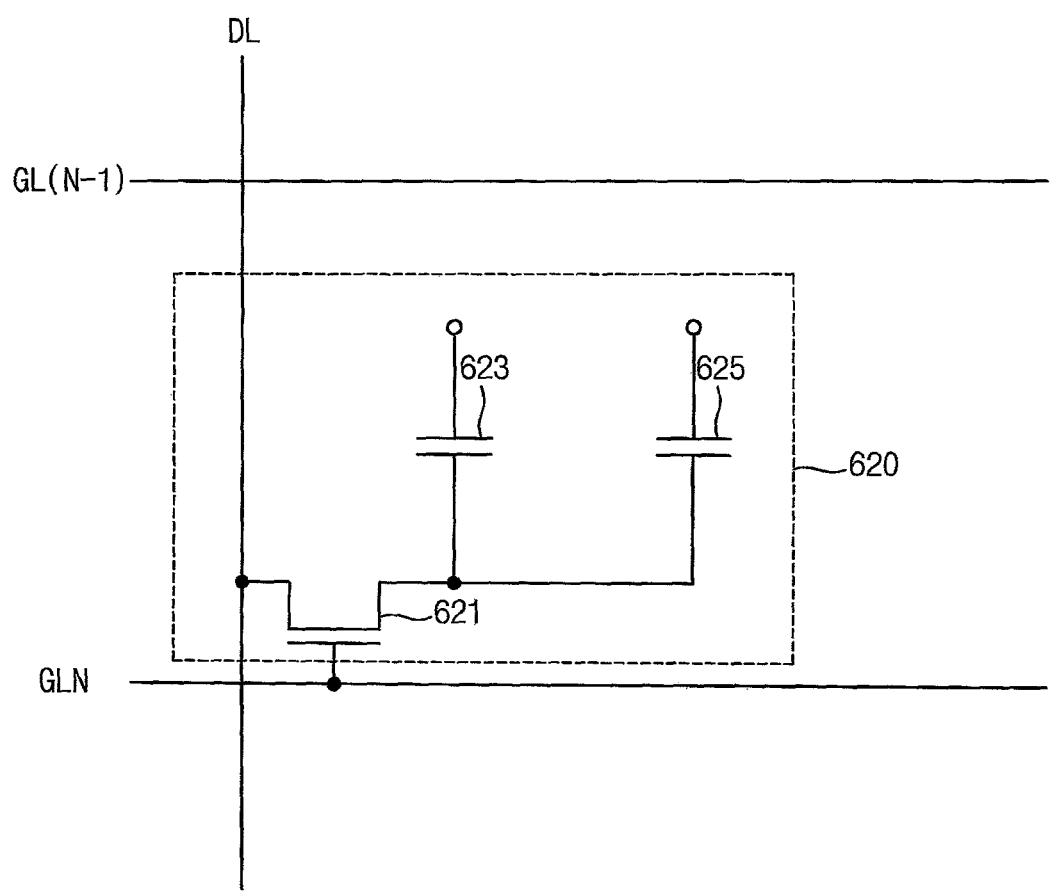
FIG. 13 is a circuit diagram illustrating an exemplary embodiment of a pixel according to the invention.

FIG. 13 is a circuit diagram illustrating a pixel according to the illustrated exemplary embodiment of the invention.

The pixel 620 according to the exemplary embodiment illustrated in FIG. 13 may be included in the display panel 110 of the display apparatus 100 according to the previous exemplary embodiment illustrated in FIG. 1. In addition, a display apparatus including the pixel 620 according to the exemplary embodiment illustrated in FIG. 13 may be substantially the same as the display apparatus 100 according to the previous exemplary embodiment illustrated in FIG. 1 except for the pixel 620. Thus, the same reference numerals will be used to refer to same or like parts as those described in the previous exemplary embodiment and any further repetitive explanation concerning the above elements will be omitted.

Referring to FIG. 13, the pixel 620 may include a TFT 621 electrically connected to the N-th gate line GLN and the data line DL, a liquid crystal capacitor 623 and a storage capacitor 625 connected to the TFT 621. Here, the N-th gate line GLN may be any of the first to K-th gate lines GL1, GL2, . . . , GL(K−1) and GLK of FIG. 1.

Figure 14:
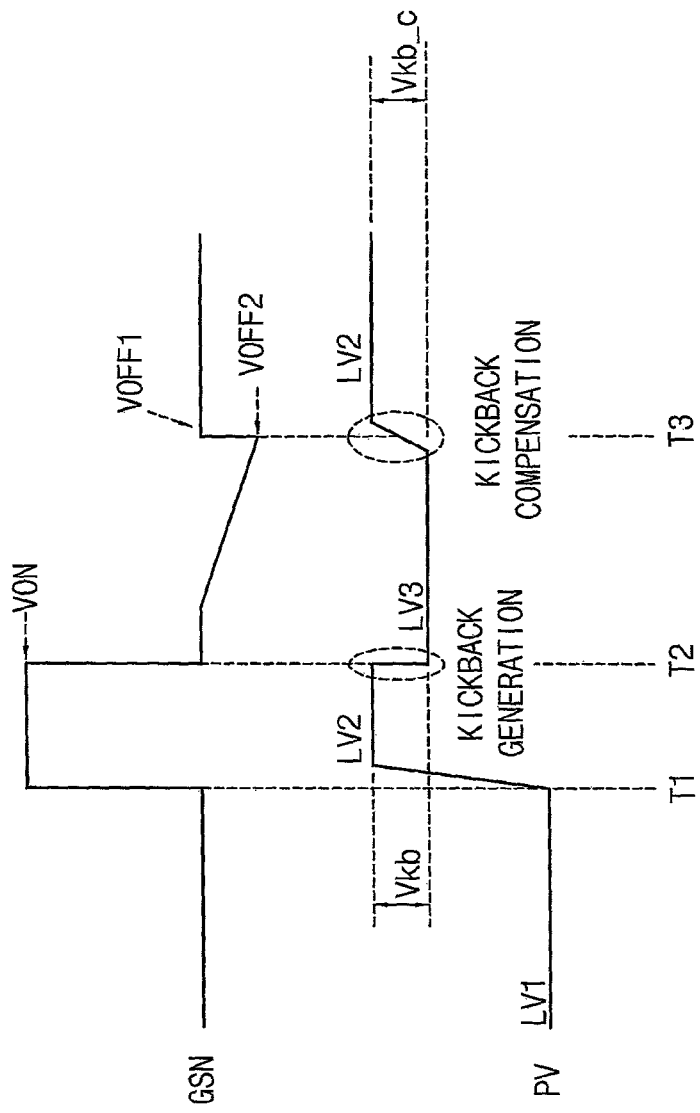
FIG. 14 is a timing diagram illustrating an N-th gate signal applied to an N-th gate line, and a pixel voltage charged in the pixel of FIG. 13.

FIG. 14 is a timing diagram illustrating an N-th gate signal GSN applied to the N-th gate line GLN, and a pixel voltage PV charged in the pixel 620 of FIG. 13.

The N-th gate signal GSN may be controlled by the kickback compensating part 200 of FIG. 3. Alternatively, the N-th gate signal GSN may be controlled by the kickback compensating part 300 of FIG. 8.

Referring to FIGS. 1, 3, 8, 13 and 14, the N-th gate signal GSN increases from the first gate off voltage VOFF1 to the gate on voltage VON at a first timing T1. Therefore, the TFT 621 electrically connected to the N-th gate line GLN turns on, and thus the pixel voltage PV increases from a first level LV1 to a second level LV2. The first level LV1 may be referred to as a low level and the second level LV2 may be referred to as a high level.

The N-th gate signal GSN decreases from the gate on voltage VON to the first gate off voltage VOFF1 at a second timing T2 after the first timing T1. Therefore, the pixel voltage PV decreases from the second level LV2 to a third level L3 due to a kickback voltage Vkb. Here, the third level LV3 is a level between the first level LV1 and the second level LV2.

The N-th gate signal GSN gradually decreases from the first gate off voltage VOFF1 to the second gate off voltage VOFF2 between the second timing T2 and a third timing T3 after the second timing T2. In an exemplary embodiment, the N-th gate signal GSN may gradually decrease from the first gate off voltage VOFF1 to the second gate off voltage VOFF2 during two horizontal times in which two gate lines are driven, for example. However, the invention is not limited thereto, and in another exemplary embodiment, the number of horizontal times for which the gate signal GS gradually decreases from the first gate off voltage VOFF1 to the second gate off voltage VOFF2 may be different from two. Since the N-th gate signal GSN gradually decreases from the first gate off voltage VOFF1 to the second gate off voltage VOFF2, the charge coupling effect according to the level change from the first gate off voltage VOFF1 to the second gate off voltage VOFF2 may be prevented, and the decrease of the pixel voltage PV due to the charge coupling effect may be prevented.

The N-th gate signal GSN increases from the second gate off voltage VOFF2 to the first gate off voltage VOFF1 at the third timing T3. Therefore, the pixel voltage PV increases from the third level LV3 to the second level LV2 by a kickback compensation voltage Vkb_c due to a charge coupling effect.

Thus, the pixel voltage PV decreased due to the kickback voltage Vkb may be compensated by the kickback compensation voltage Vkb_c.

Figure 15A:
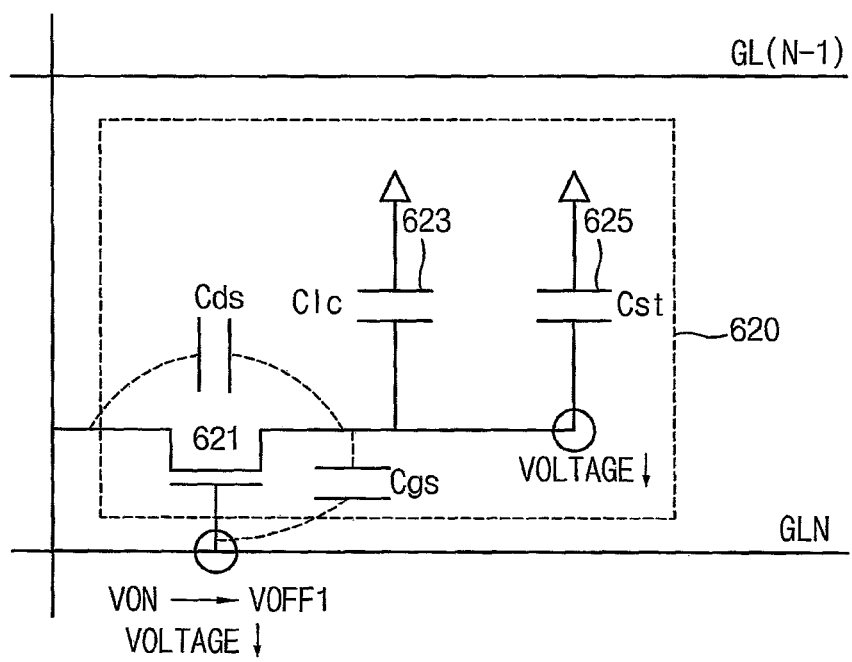
FIG. 15A is the circuit diagram illustrating the pixel of FIG. 13 for describing a kickback voltage of FIG. 14.

FIG. 15A is the circuit diagram illustrating the pixel 620 of FIG. 13 for describing the kickback voltage Vkb of FIG. 14.

Referring to FIGS. 14 and 15A, the N-th gate signal GSN applied to the N-th gate line GLN decreases from the gate on voltage VON to the first gate off voltage VOFF1 at the second timing T2. Therefore, a voltage of a gate electrode in the TFT 621 decreases from the gate on voltage VON to the first gate off voltage VOFF1. Thus, the pixel voltage PV between the TFT 621 and the storage capacitor 625 decreases due to the kickback voltage Vkb.

Figure 15B:
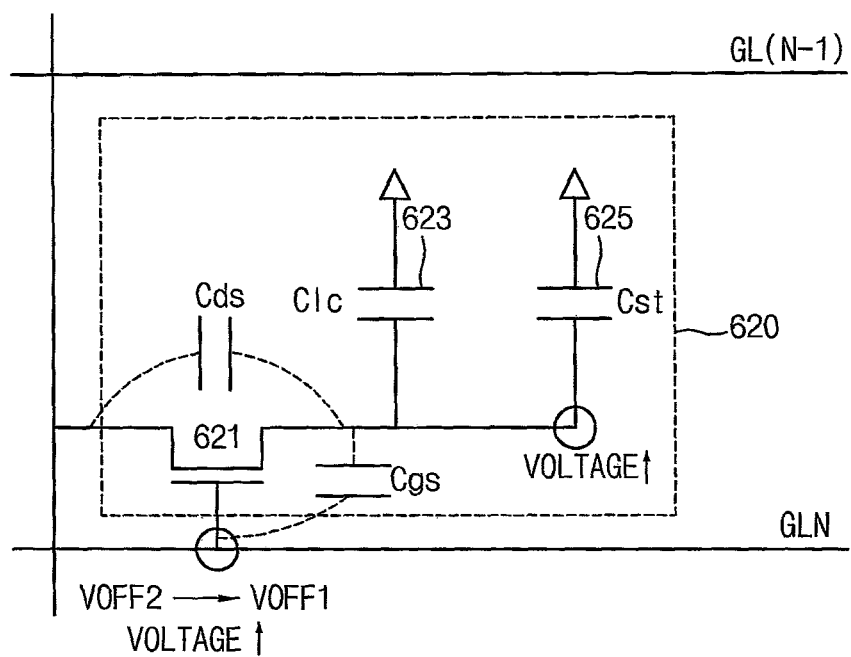
FIG. 15B is the circuit diagram illustrating the pixel of FIG. 13 for describing a kickback compensation voltage of FIG. 14.

FIG. 15B is the circuit diagram illustrating the pixel 620 of FIG. 13 for describing the kickback compensation voltage Vkb_c of FIG. 14.

Referring to FIGS. 14 and 15B, the N-th gate signal GSN applied to the N-th gate line GLN increases from the second gate off voltage VOFF2 to the first gate off voltage VOFF1 at the third timing T3. Therefore, the voltage of the gate electrode in the TFT 621 increases from the second gate off voltage VOFF2 to the first gate off voltage VOFF1. Thus, the pixel voltage PV between the TFT 621 and the storage capacitor 625 increases by the kickback compensation voltage Vkb_c.

Figure 16:
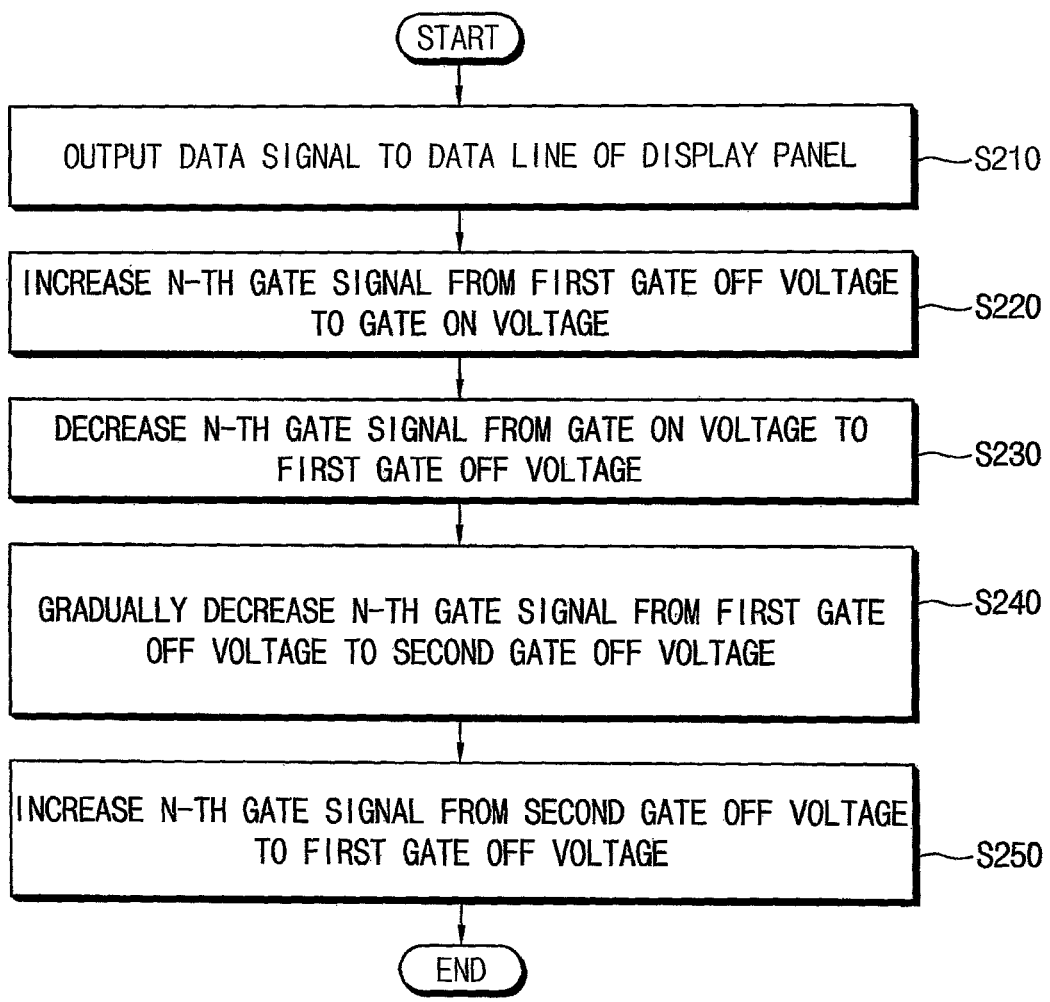
FIG. 16 is a flowchart illustrating a method of driving the display apparatus including the pixel of FIG. 13.

FIG. 16 is a flowchart illustrating a method of driving the display apparatus 100 including the pixel 620 of FIG. 13.

Referring to FIGS. 1 and 13 to 16, the data signal DS is output to the data line DL of display panel 110 (operation S210). Specifically, the data driving part 140 receives the image data DATA from the timing controlling part 150, generates the data signal DS using the image data DATA, and outputs the data signal DS to the data line DL in response to the horizontal start signal STH and the second clock signal CLK2 provided from the timing controlling part 150.

The N-th gate signal GSN increases from the first gate off voltage VOFF1 to the gate on voltage VON (operation S220). Specifically, the gate driving part 130 increases the N-th gate signal GSN from the first gate off voltage VOFF1 to the gate on voltage VON at the first timing T1. Therefore, the TFT 621 electrically connected to the N-th gate line GLN turns on, and thus the pixel voltage PV increases from the first level LV1 to the second level LV2. The first level LV1 may be referred to as the low level and the second level LV2 may be referred to as the high level.

The N-th gate signal GSN decreases from the gate on voltage VON to the first gate off voltage VOFF1 (operation S230). Specifically, the gate driving part 130 decreases the N-th gate signal GSN from the gate on voltage VON to the first gate off voltage VOFF1 at the second timing T2 after the first timing T1. Therefore, the pixel voltage PV decreases from the second level LV2 to the third level L3 due to the kickback voltage Vkb. Here, the third level LV3 is the level between the first level LV1 and the second level LV2.

The N-th gate signal GSN gradually decreases from the first gate off voltage VOFF1 to the second gate off voltage VOFF2 (operation S240). Specifically, the gate driving part 130 gradually decreases the N-th gate signal from the first gate off voltage VOFF1 to the second gate off voltage VOFF2 between the second timing T2 and the third timing T3. In an exemplary embodiment, the gate driving part 130 gradually decreases the N-th gate signal from the first gate off voltage VOFF1 to the second gate off voltage VOFF2 during two horizontal times in which two gate lines are driven, for example. Since the gate driving part 130 gradually decreases the N-th gate signal from the first gate off voltage VOFF1 to the second gate off voltage VOFF2, the charge coupling effect according to the level change from the first gate off voltage VOFF1 to the second gate off voltage VOFF2 may be prevented, and the decrease of the pixel voltage PV due to the charge coupling effect may be prevented.

The N-th gate signal GSN increases from the second gate off voltage VOFF2 to the first gate off voltage VOFF1 (operation S250). Specifically, the gate driving part 130 increases the N-th gate signal GSN from the second gate off voltage VOFF2 to the first gate off voltage VOFF1 at the third timing T3. Therefore, the pixel voltage PV increases from the third level LV3 to the second level LV2 by the kickback compensation voltage Vkb_c due to the charge coupling effect.

Thus, the pixel voltage PV decreased due to the kickback voltage Vkb may be compensated by the kickback compensation voltage Vkb_c.

According to the illustrated exemplary embodiment, the pixel voltage PV decreased due to the kickback voltage Vkb may be compensated by the kickback compensation voltage Vkb_c. Therefore, a charge rate decrease of the pixel 620 may be prevented, and thus display quality of the display apparatus 100 including the pixel 620 may be improved.

FIG. 17 is a timing diagram illustrating an N-th gate signal and a pixel voltage according to an exemplary embodiment of the invention.

The N-th gate signal GSN according to the exemplary embodiment illustrated in FIG. 17 may be applied to the N-th gate line GLN according to the previous exemplary embodiment illustrated in FIG. 13. In addition, the pixel voltage PV according to the exemplary embodiment illustrated in FIG. 17 may be charged in the pixel 620 according to the previous exemplary embodiment illustrated in FIG. 13. In addition, the N-th gate signal GSN according to the exemplary embodiment illustrated in FIG. 17 may be controlled by the kickback compensating part 500 according to the previous exemplary embodiment illustrated in FIG. 10. Thus, the same reference numerals will be used to refer to same or like parts as those described in the previous exemplary embodiment and any further repetitive explanation concerning the above elements will be omitted.

Referring to FIGS. 10, 13 and 17, the N-th gate signal GSN increases from the first gate off voltage VOFF1 to the gate on voltage VON at a first timing T1. Therefore, the TFT 621 electrically connected to the N-th gate line GLN turns on, and thus the pixel voltage PV increases from a first level LV1 to a second level LV2. The first level LV1 may be referred to as a low level and the second level LV2 may be referred to as a high level.

The N-th gate signal GSN decreases from the gate on voltage VON to the first gate off voltage VOFF1 at a second timing T2 after the first timing T1. Therefore, the pixel voltage PV decreases from the second level LV2 to a third level L3 due to a kickback voltage Vkb. Here, the third level LV3 is a level between the first level LV1 and the second level LV2.

The N-th gate signal GSN gradually decreases from the first gate off voltage VOFF1 to the second gate off voltage VOFF2 between the second timing T2 and a third timing T3 after the second timing T2. In an exemplary embodiment, the N-th gate signal GSN may gradually decrease from the first gate off voltage VOFF1 to the second gate off voltage VOFF2 during two horizontal times in which two gate lines are driven, for example. However, the invention is not limited thereto, and in another exemplary embodiment, the number of horizontal times for which the gate signal GS gradually decreases from the first gate off voltage VOFF1 to the second gate off voltage VOFF2 may be different from two. Since the N-th gate signal GSN gradually decreases from the first gate off voltage VOFF1 to the second gate off voltage VOFF2, the charge coupling effect according to the level change from the first gate off voltage VOFF1 to the second gate off voltage VOFF2 may be prevented, and the decrease of the pixel voltage PV due to the charge coupling effect may be prevented.

The N-th gate signal GSN increases from the second gate off voltage VOFF2 to the first gate off voltage VOFF1 at the third timing T3. Therefore, the pixel voltage PV increases from the third level LV3 to the second level LV2 by a kickback compensation voltage Vkb_c due to a charge coupling effect.

Thus, the pixel voltage PV decreased due to the kickback voltage Vkb may be compensated by the kickback compensation voltage Vkb_c.

According to the illustrated exemplary embodiment, the pixel voltage PV decreased due to the kickback voltage Vkb may be compensated by the kickback compensation voltage Vkb_c. Therefore, a charge rate decrease of the pixel 620 may be prevented, and thus display quality of the display apparatus 100 including the pixel 620 may be improved.

The invention may be applied to an electronic device having a display apparatus. In an exemplary embodiment, the invention may be applied to various display devices such as a television, a computer monitor, a laptop, a digital camera, a cellular phone, a smart phone, a tablet personal computer ("PC"), a smart pad, a personal digital assistant ("PDA"), a portable multimedia player ("PMP"), an MP3 player, a navigation system, a camcorder, a portable game console, etc.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A display apparatus comprising:
   a display panel which displays an image, and comprises gate lines, data lines and a pixel;
   a data driving part which outputs data signals to the data lines, respectively; and
   a gate driving part which outputs gate signals to the gate lines, respectively, increases a gate signal of the gate signals from a first gate off voltage to a gate on voltage, decreases the gate signal from the gate on voltage to the first gate off voltage, decreases the gate signal from the first gate off voltage to a second gate off voltage in a slope less than a slope in which the gate signal decreases from the gate on voltage to the first gate off voltage, during P horizontal time in which P gate line of the gate lines is driven, where P is a natural number, and increases the gate signal from the second gate off voltage to the first gate off voltage.

2. The display apparatus of claim 1, wherein the gate driving part decreases the gate signal from the first gate off voltage to the second gate off voltage during two horizontal time in which two gate lines of the gate lines are driven.

3. The display apparatus of claim 1, wherein the gate lines comprises an N-th gate line and an (N−1)-th gate line, where N is a natural number equal to or greater than two, and
   wherein the display panel further comprises:
   a thin film transistor electrically connected to the data line and the N-th gate line;
   a liquid crystal capacitor electrically connected to the thin film transistor; and
   a storage capacitor electrically connected to the thin film transistor and the (N−1)-th gate line.

4. The display apparatus of claim 3, wherein the gate driving part comprises a kickback compensating part which controls the gate signal as the gate on voltage, the first gate off voltage and the second gate off voltage in response to a first gate control signal, a second gate control signal and a third gate control signal.

5. The display apparatus of claim 4, wherein the kickback compensating part comprises:
   a first switch which is disposed between the gate line and a gate on voltage line to which the gate on voltage is applied, and electrically connects or disconnects the gate line to or from the gate on voltage line in response to the first gate control signal;

a second switch which is disposed between the gate line and a first gate off voltage line to which the first gate off voltage is applied, and electrically connects or disconnects the gate line to or from the first gate off voltage line in response to the second gate control signal;

a variable resistor disposed between the gate line and a second gate off voltage line to which the second gate off voltage is applied; and a third switch which is disposed between the variable resistor and the gate line, and electrically connects or disconnects the variable resistor to or from the gate line in response to the third gate control signal.

6. The display apparatus of claim 5, wherein the first gate control signal is activated, the second gate control signal is deactivated and the third gate control signal is deactivated during a first time period, the first gate control signal is deactivated, the second gate control signal is activated and the third gate control signal is deactivated during a second time period following the first time period, the first gate control signal is deactivated, the second gate control signal is deactivated and the third gate control signal is activated during a third time period following the second time period, and the first gate control signal is deactivated, the second gate control signal is activated and the third gate control signal is deactivated during a fourth time period following the third time period.

7. The display apparatus of claim 6, wherein the gate signal corresponds to the gate on voltage during the first time period, the gate signal corresponds to the first gate off voltage during the second time period, the gate signal decreases from the first gate off voltage to the second gate off voltage during the third time period corresponding to the P horizontal time, and the gate signal corresponds to the first gate off voltage during the fourth time period.

8. The display apparatus of claim 4, wherein the kickback compensating part comprises:

a first switch which is disposed between the gate line and a gate on voltage line to which the gate on voltage is applied, and electrically connects or disconnects the gate line to or from the gate on voltage line in response to the first gate control signal;

a second switch which is disposed between the gate line and a first gate off voltage line to which the first gate off voltage is applied, and electrically connects or disconnects the gate line to or from the first gate off voltage line in response to the second gate control signal;

a low pass filter disposed between the gate line and a second gate off voltage line to which the second gate off voltage is applied; and a third switch which is disposed between the gate line and the low pass filter, and electrically connects or disconnects the gate line to or from the low pass filter in response to the third gate control signal.

9. The display apparatus of claim 4, wherein the gate signals comprises an N-th gate signal applied to the N-th gate line, and an (N−1)-th gate signal applied to the (N−1)-th gate line, the (N−1)-th gate signal increases from the first gate off voltage to the gate on voltage at a first timing, the (N−1)-th gate signal decreases from the gate on voltage to the first gate off voltage and the N-th gate signal increases from the first gate off voltage to the gate on voltage at a second timing after the first timing, the N-th gate signal decreases from the gate on voltage to the first gate off voltage at a third timing after the second timing, the (N−1)-th gate signal decreases from the first gate off voltage to the second gate off voltage during two horizontal times corresponding to a time between the second timing and a fourth timing after the third timing, the (N−1)-th gate signal increases from the second gate off voltage to the first gate off voltage, the N-th gate signal decreases from the first gate off voltage to the second gate off voltage during two horizontal times corresponding to a time between the third timing and a fifth timing after the fourth timing, and the N-th gate signal increases from the second gate off voltage to the first gate off voltage.

10. The display apparatus of claim 9, wherein a pixel voltage charged in the pixel of the display panel increases from a first level to a second level at the second timing, decreases from the second level to a third level between the first level and the second level due to a kickback voltage at the third timing, increases from the third level to a fourth level between the third level and the second level by a first kickback compensation voltage at the fourth timing, and increases from the fourth level to the second level by a second kickback compensation voltage at the fifth timing.

11. The display apparatus of claim 10, wherein the first kickback compensation voltage is calculated by $$Vkb\_C1 = \frac{Cst}{Clc + Cst + Cgs + Cds} \times (VOFF2 - VOFF1),$$

where 'Vkb_C1' denotes the first kickback compensation voltage, 'Clc' denotes a capacitance of the liquid crystal capacitor, 'Cst' denotes a capacitance of the storage capacitor, 'Cgs' denotes a capacitance between a gate electrode and a source electrode of the thin film transistor, 'Cds' denotes a capacitance between a drain electrode and the source electrode of the thin film transistor, 'VOFF2' denotes the second gate off voltage, and 'VOFF1' denotes the first gate off voltage.

12. The display apparatus of claim 10, wherein the second kickback compensation voltage is calculated by $$Vkb\_C2 = \frac{Cgs}{Clc + Cst + Cgs + Cds} \times (VOFF2 - VOFF1),$$

where 'Vkb_C2' denotes the second kickback compensation voltage, 'Clc' denotes a capacitance of the liquid crystal capacitor, 'Cst' denotes a capacitance of the storage capacitor, 'Cgs' denotes a capacitance between a gate electrode and a source electrode of the thin film transistor, 'Cds' denotes a capacitance between a drain electrode and the source electrode of the thin film transistor, 'VOFF2' denotes the second gate off voltage, and 'VOFF1' denotes the first gate off voltage.

13. The display apparatus of claim 4, wherein the kickback compensating part comprises:

a first switch which is disposed between the gate line and a gate on voltage line to which the gate on voltage is applied, and electrically connects or disconnects the gate line to or from the gate on voltage line in response to the first gate control signal;

a second switch which is disposed between the gate line and a first gate off voltage line to which the first gate off voltage is applied, and electrically connects or disconnects the gate line to or from the first gate off voltage line in response to the second gate control signal;

a current source disposed between the gate line and a ground voltage terminal to which a ground voltage is applied; and a third switch which is disposed between the gate line and the current source, and electrically connects or disconnects the gate line to or from the current source in response to the third gate control signal.

14. The display apparatus of claim 13, wherein the first gate control signal is activated, the second gate control signal is deactivated and the third gate control signal is deactivated during a first time period, the first gate control signal is deactivated, the second gate control signal is activated and the third gate control signal is activated during a second time period following the first time period, and the first gate control signal is deactivated, the second gate control signal is activated and the third gate control signal is deactivated during a third time period following the second time period.

15. The display apparatus of claim 14, wherein the gate signal corresponds to the gate on voltage during the first time period, the gate signal decreases from the first gate off voltage to the second gate off voltage during the second time period corresponding to the P horizontal time, and the gate signal corresponds to the first gate off voltage during the third time period.

16. The display apparatus of claim 15, wherein the second gate off voltage is determined according to a current of the current source and a pulse width of the second gate control signal.

17. A method of driving a display apparatus, the method comprising:

outputting a data signal to a data line of a display panel displaying an image and comprising gate lines including an (N−1)-th gate line and an N-th gate line, the data line and a pixel, where N is a natural number equal to or greater than two;

increasing an (N−1)-th gate signal applied to the (N−1)-th gate line from a first gate off voltage to a gate on voltage;

decreasing the (N−1)-th gate signal from the gate on voltage to the first gate off voltage;

increasing an N-th gate signal applied to the N-th gate line from the first gate off voltage to the gate on voltage;

decreasing the N-th gate signal from the gate on voltage to the first gate off voltage;

decreasing the (N−1)-th gate signal from the first gate off voltage to a second gate off voltage in a slope less than a slope in which the (N−1)-th gate signal decreases from the gate on voltage to the first gate off voltage, during P horizontal time in which P gate line is driven, where P is a natural number;

increasing the (N−1)-th gate signal from the second gate off voltage to the first gate off voltage;

decreasing the N-th gate signal from the first gate off voltage to the second gate off voltage in a slope less than a slope in which the N-th gate signal decreases from the gate on voltage to the first gate off voltage, during P horizontal time;

increasing the N-th gate signal from the second gate off voltage to the first gate off voltage.

18. The method of claim 17, wherein the decreasing (N−1)-th gate signal from the first gate off voltage to the second gate off voltage comprises decreasing (N−1)-th gate signal from the first gate off voltage to the second gate off voltage during two horizontal times in which two gate lines of the gate lines are driven, and the decreasing the N-th gate signal from the first gate off voltage to the second gate off voltage comprises decreasing the N-th gate signal from the first gate off voltage to the second gate off voltage during two horizontal times in which two gate lines of the gate lines are driven.

19. The method of claim 18, wherein the increasing the (N−1)-th gate signal from the first gate off voltage to the gate on voltage comprises increasing the (N−1)-th gate signal from the first gate off voltage to the gate on voltage at a first timing, the decreasing the (N−1)-th gate signal from the gate on voltage to the first gate off voltage comprises decreasing the (N−1)-th gate signal from the gate on voltage to the first gate off voltage at a second timing after the first timing;

the increasing the N-th gate signal from the first gate off voltage to the gate on voltage comprises increasing the N-th gate signal from the first gate off voltage to the gate on voltage at the second timing;

the decreasing the N-th gate signal from the gate on voltage to the first gate off voltage comprises decreasing the N-th gate signal from the gate on voltage to the first gate off voltage at a third timing after the second timing;

the decreasing the (N−1)-th gate signal from the first gate off voltage to the second gate off voltage comprises decreasing the (N−1)-th gate signal from the first gate off voltage to the second gate off voltage during two horizontal times corresponding to a time between the second timing and a fourth timing after the third timing;

the increasing the (N−1)-th gate signal from the second gate off voltage to the first gate off voltage comprises increasing the (N−1)-th gate signal from the second gate off voltage to the first gate off voltage at the fourth timing;

the decreasing the N-th gate signal from the first gate off voltage to the second gate off voltage comprises decreasing the N-th gate signal from the first gate off voltage to the second gate off voltage during two horizontal times corresponding to a time between the third timing and a fifth timing after the fourth timing; and the increasing the N-th gate signal from the second gate off voltage to the first gate off voltage comprises increasing the N-th gate signal from the second gate off voltage to the first gate off voltage at the fifth timing.

20. The method of claim 19, wherein a pixel voltage charged in the pixel of the display panel increases from a first level to a second level at the second timing, decreases from the second level to a third level between the first level and the second level due to a kickback voltage at the third timing, increases from the third level to a fourth level between the third level and the second level by a first kickback compensation voltage at the fourth timing, and increases from the fourth level to the second level by a second kickback compensation voltage at the fifth timing.

* * * * *